United States Patent [19]
Cordery et al.

[11] Patent Number: 5,655,023
[45] Date of Patent: Aug. 5, 1997

[54] ADVANCED POSTAGE PAYMENT SYSTEM EMPLOYING PRE-COMPUTED DIGITAL TOKENS AND WITH ENHANCED SECURITY

[75] Inventors: Robert A. Cordery, Danbury; Frank M. D'Ippolito, Shelton; Leon A. Pintsov, W. Hartford, all of Conn.

[73] Assignee: Pitney Bowes Inc., Stamford, Conn.

[21] Appl. No.: 242,564

[22] Filed: May 13, 1994

[51] Int. Cl.⁶ .................. H04L 9/00; G06G 7/48
[52] U.S. Cl. .................. 380/51; 380/23; 380/24; 380/49; 380/55; 235/379; 235/380; 364/464.11; 364/464.17
[58] Field of Search .................. 380/4, 9, 22, 23, 380/24, 25, 49, 50, 52, 55, 51; 235/379, 380; 364/464.02, 464.03

[56] References Cited

U.S. PATENT DOCUMENTS

| | | |
|---|---|---|
| 3,978,457 | 8/1976 | Check et al. . |
| 4,168,533 | 9/1979 | Schwartz . |
| 4,222,518 | 9/1980 | Simjian . |
| 4,226,360 | 10/1980 | Simjian . |
| 4,301,507 | 11/1981 | Soderberg et al. . |
| 4,493,252 | 1/1985 | Clark . |
| 4,579,054 | 4/1986 | Buan et al. . |
| 4,629,871 | 12/1986 | Scribner et al. . |
| 4,725,718 | 2/1988 | Sansone et al. . |
| 4,757,532 | 7/1988 | Gilham .................. 380/23 |
| 4,757,537 | 7/1988 | Edelmann et al. .................. 380/51 |
| 4,775,246 | 10/1988 | Edelmann et al. . |
| 4,802,218 | 1/1989 | Wright et al. .................. 380/23 |
| 4,831,555 | 5/1989 | Sansone et al. . |
| 4,873,645 | 10/1989 | Hunter et al. . |
| 4,900,903 | 2/1990 | Wright et al. . |
| 4,900,904 | 2/1990 | Wright et al. .................. 235/380 X |
| 4,907,271 | 3/1990 | Gilham . |
| 4,973,828 | 11/1990 | Naruse et al. . |
| 5,272,320 | 12/1993 | Hakamada . |
| 5,448,641 | 9/1995 | Pintsov et al. .................. 380/51 |

*Primary Examiner*—Bernarr E. Gregory
*Attorney, Agent, or Firm*—Charles R. Malandra, Jr.; Melvin J. Scolnick; David E. Pitchenik

[57] ABSTRACT

A method and system for postage payment include the generation of a plurality of dispensable discrete items of encrypted data. Each of the items of encrypted data, which may be digital tokens, have a specific value. The generated plurality of discrete items of encrypted data are stored on a portable medium. A prepayment value is also stored on the portable medium. The dispensing of the stored plurality of discrete items of encrypted data is limited based on the prepayment value stored on the portable medium. The medium may be a device or member having memory for storing a plurality of dispensable tokens. The portable member or device may have a housing with a register within the housing. The postage prepayment value is stored in the register. The plurality of discrete items of encrypted data is stored in the housing with each of the items of encrypted data adapted to be formatted for printing. Structure within the housing is coupled to the plurality of discrete items of encrypted data and to the prepayment register for enabling at least one selected item of encrypted data to be communicated outside of the housing if the value stored in register is at least equal to the specific value of the selected item of encrypted data.

27 Claims, 11 Drawing Sheets

| FIG. 7A | FIG.7B |
|---|---|

FIG. 7A

MAXIMUM NUMBER OF MAIL PIECES PER DAY

|  | 5 | 10 | 15 | 20 | 25 | 30 | 35 | 40 | 45 | 50 |
|---|---|---|---|---|---|---|---|---|---|---|
| 10 | 0.1 | 0.2 | 0.3 | 0.4 | 0.5 | 0.6 | 0.7 | 0.8 | 0.9 | 1 |
| 12 | 0.12 | 0.24 | 0.36 | 0.48 | 0.6 | 0.72 | 0.84 | 0.96 | 1.08 | 1.2 |
| 14 | 0.14 | 0.28 | 0.42 | 0.56 | 0.7 | 0.84 | 0.98 | 1.12 | 1.26 | 1.4 |
| 16 | 0.16 | 0.32 | 0.48 | 0.64 | 0.8 | 0.96 | 1.12 | 1.28 | 1.44 | 1.6 |
| 18 | 0.18 | 0.36 | 0.54 | 0.72 | 0.9 | 1.08 | 1.26 | 1.44 | 1.62 | 1.8 |
| 20 | 0.2 | 0.4 | 0.6 | 0.8 | 1 | 1.2 | 1.4 | 1.6 | 1.8 | 2 |
| 22 | 0.22 | 0.44 | 0.66 | 0.88 | 1.1 | 1.32 | 1.54 | 1.76 | 1.98 | 2.2 |
| 24 | 0.24 | 0.48 | 0.72 | 0.96 | 1.2 | 1.44 | 1.68 | 1.92 | 2.16 | 2.4 |
| 26 | 0.26 | 0.52 | 0.78 | 1.04 | 1.3 | 1.56 | 1.82 | 2.08 | 2.34 | 2.6 |
| 28 | 0.28 | 0.56 | 0.84 | 1.12 | 1.4 | 1.68 | 1.96 | 2.24 | 2.52 | 2.8 |
| 30 | 0.3 | 0.6 | 0.9 | 1.2 | 1.5 | 1.8 | 2.1 | 2.4 | 2.7 | 3 |
| 32 | 0.32 | 0.64 | 0.96 | 1.28 | 1.6 | 1.92 | 2.24 | 2.56 | 2.88 | 3.2 |
| 34 | 0.34 | 0.68 | 1.02 | 1.36 | 1.7 | 2.04 | 2.38 | 2.72 | 3.06 | 3.4 |
| 36 | 0.36 | 0.72 | 1.08 | 1.44 | 1.8 | 2.16 | 2.52 | 2.88 | 3.24 | 3.6 |
| 38 | 0.38 | 0.76 | 1.14 | 1.52 | 1.9 | 2.28 | 2.66 | 3.04 | 3.42 | 3.8 |
| 40 | 0.4 | 0.8 | 1.2 | 1.6 | 2 | 2.4 | 2.8 | 3.2 | 3.6 | 4 |
| 42 | 0.42 | 0.84 | 1.26 | 1.68 | 2.1 | 2.52 | 2.94 | 3.36 | 3.78 | 4.2 |
| 44 | 0.44 | 0.88 | 1.32 | 1.76 | 2.2 | 2.64 | 3.08 | 3.52 | 3.96 | 4.4 |
| 46 | 0.46 | 0.92 | 1.38 | 1.84 | 2.3 | 2.76 | 3.22 | 3.68 | 4.14 | 4.6 |
| 48 | 0.48 | 0.96 | 1.44 | 1.92 | 2.4 | 2.88 | 3.36 | 3.84 | 4.32 | 4.8 |
| 50 | 0.5 | 1 | 1.5 | 2 | 2.5 | 3 | 3.5 | 4 | 4.5 | 5 |
| 52 | 0.52 | 1.04 | 1.56 | 2.08 | 2.6 | 3.12 | 3.64 | 4.16 | 4.68 | 5.2 |
| 54 | 0.54 | 1.08 | 1.62 | 2.16 | 2.7 | 3.24 | 3.78 | 4.32 | 4.86 | 5.4 |
| 56 | 0.56 | 1.12 | 1.68 | 2.24 | 2.8 | 3.36 | 3.92 | 4.48 | 5.04 | 5.6 |
| 58 | 0.58 | 1.16 | 1.74 | 2.32 | 2.9 | 3.48 | 4.06 | 4.64 | 5.22 | 5.8 |
| 60 | 0.6 | 1.2 | 1.8 | 2.4 | 3 | 3.6 | 4.2 | 4.8 | 5.4 | 6 |
| 62 | 0.62 | 1.24 | 1.86 | 2.48 | 3.1 | 3.72 | 4.34 | 4.96 | 5.58 | 6.2 |
| 64 | 0.64 | 1.28 | 1.92 | 2.56 | 3.2 | 3.84 | 4.48 | 5.12 | 5.76 | 6.4 |
| 66 | 0.66 | 1.32 | 1.98 | 2.64 | 3.3 | 3.96 | 4.62 | 5.28 | 5.94 | 6.6 |
| 68 | 0.68 | 1.36 | 2.04 | 2.72 | 3.4 | 4.08 | 4.76 | 5.44 | 6.12 | 6.8 |
| 70 | 0.7 | 1.4 | 2.1 | 2.8 | 3.5 | 4.2 | 4.9 | 5.6 | 6.3 | 7 |
| 72 | 0.72 | 1.44 | 2.16 | 2.88 | 3.6 | 4.32 | 5.04 | 5.76 | 6.48 | 7.2 |
| 74 | 0.74 | 1.48 | 2.22 | 2.96 | 3.7 | 4.44 | 5.18 | 5.92 | 6.66 | 7.4 |
| 76 | 0.76 | 1.52 | 2.28 | 3.04 | 3.8 | 4.56 | 5.32 | 6.08 | 6.84 | 7.6 |
| 78 | 0.78 | 1.56 | 2.34 | 3.12 | 3.9 | 4.68 | 5.46 | 6.24 | 7.02 | 7.8 |
| 80 | 0.8 | 1.6 | 2.4 | 3.2 | 4 | 4.8 | 5.6 | 6.4 | 7.2 | 8 |
| 82 | 0.82 | 1.64 | 2.46 | 3.28 | 4.1 | 4.92 | 5.74 | 6.56 | 7.38 | 8.2 |
| 84 | 0.84 | 1.68 | 2.52 | 3.36 | 4.2 | 5.04 | 5.88 | 6.72 | 7.56 | 8.4 |
| 86 | 0.86 | 1.72 | 2.58 | 3.44 | 4.3 | 5.16 | 6.02 | 6.88 | 7.74 | 8.6 |
| 88 | 0.88 | 1.76 | 2.64 | 3.52 | 4.4 | 5.28 | 6.16 | 7.04 | 7.92 | 8.8 |
| 90 | 0.9 | 1.8 | 2.7 | 3.6 | 4.5 | 5.4 | 6.3 | 7.2 | 8.1 | 9 |

NUMBER OF DAYS

MEMORY REQUIREMENTS (IN KILOBYTES) FOR 1 DENOMINATION

FIG. 7B

MAXIMUM NUMBER OF MAIL PIECES PER DAY

| | 55 | 60 | 65 | 70 | 75 | 80 | 85 | 90 | 95 | 100 |
|---|---|---|---|---|---|---|---|---|---|---|
| 10 | 1.1 | 1.2 | 1.3 | 1.4 | 1.5 | 1.6 | 1.7 | 1.8 | 1.9 | 2 |
| 12 | 1.32 | 1.44 | 1.56 | 1.68 | 1.8 | 1.92 | 2.04 | 2.16 | 2.28 | 2.4 |
| 14 | 1.54 | 1.68 | 1.82 | 1.96 | 2.1 | 2.24 | 2.38 | 2.52 | 2.66 | 2.8 |
| 16 | 1.76 | 1.92 | 2.08 | 2.24 | 2.4 | 2.56 | 2.72 | 2.88 | 3.04 | 3.2 |
| 18 | 1.98 | 2.16 | 2.34 | 2.52 | 2.7 | 2.88 | 3.06 | 3.24 | 3.42 | 3.6 |
| 20 | 2.2 | 2.4 | 2.6 | 2.8 | 3 | 3.2 | 3.4 | 3.6 | 3.8 | 4 |
| 22 | 2.42 | 2.64 | 2.86 | 3.08 | 3.3 | 3.52 | 3.74 | 3.96 | 4.18 | 4.4 |
| 24 | 2.64 | 2.88 | 3.12 | 3.36 | 3.6 | 3.84 | 4.08 | 4.32 | 4.56 | 4.8 |
| 26 | 2.86 | 3.12 | 3.38 | 3.64 | 3.9 | 4.16 | 4.42 | 4.68 | 4.94 | 5.2 |
| 28 | 3.08 | 3.36 | 3.64 | 3.92 | 4.2 | 4.48 | 4.76 | 5.04 | 5.32 | 5.6 |
| 30 | 3.3 | 3.6 | 3.9 | 4.2 | 4.5 | 4.8 | 5.1 | 5.4 | 5.7 | 6 |
| 32 | 3.52 | 3.84 | 4.16 | 4.48 | 4.8 | 5.12 | 5.44 | 5.76 | 6.08 | 6.4 |
| 34 | 3.74 | 4.08 | 4.42 | 4.76 | 5.1 | 5.44 | 5.78 | 6.12 | 6.46 | 6.8 |
| 36 | 3.96 | 4.32 | 4.68 | 5.04 | 5.4 | 5.76 | 6.12 | 6.48 | 6.84 | 7.2 |
| 38 | 4.18 | 4.56 | 4.94 | 5.32 | 5.7 | 6.08 | 6.46 | 6.84 | 7.22 | 7.6 |
| 40 | 4.4 | 4.8 | 5.2 | 5.6 | 6 | 6.4 | 6.8 | 7.2 | 7.6 | 8 |
| 42 | 4.62 | 5.04 | 5.46 | 5.88 | 6.3 | 6.72 | 7.14 | 7.56 | 7.98 | 8.4 |
| 44 | 4.84 | 5.28 | 5.72 | 6.16 | 6.6 | 7.04 | 7.48 | 7.92 | 8.36 | 8.8 |
| 46 | 5.06 | 5.52 | 5.98 | 6.44 | 6.9 | 7.36 | 7.82 | 8.28 | 8.74 | 9.2 |
| 48 | 5.28 | 5.76 | 6.24 | 6.72 | 7.2 | 7.68 | 8.16 | 8.64 | 9.12 | 9.6 |
| 50 | 5.5 | 6 | 6.5 | 7 | 7.5 | 8 | 8.5 | 9 | 9.5 | 10 |
| 52 | 5.72 | 6.24 | 6.76 | 7.28 | 7.8 | 8.32 | 8.84 | 9.36 | 9.88 | 10.4 |
| 54 | 5.94 | 6.48 | 7.02 | 7.56 | 8.1 | 8.64 | 9.18 | 9.72 | 10.26 | 10.8 |
| 56 | 6.16 | 6.72 | 7.28 | 7.84 | 8.4 | 8.96 | 9.52 | 10.08 | 10.64 | 11.2 |
| 58 | 6.38 | 6.96 | 7.54 | 8.12 | 8.7 | 9.28 | 9.86 | 10.44 | 11.02 | 11.6 |
| 60 | 6.6 | 7.2 | 7.8 | 8.4 | 9 | 9.6 | 10.2 | 10.8 | 11.4 | 12 |
| 62 | 6.82 | 7.44 | 8.06 | 8.68 | 9.3 | 9.92 | 10.54 | 11.16 | 11.78 | 12.4 |
| 64 | 7.04 | 7.68 | 8.32 | 8.96 | 9.6 | 10.24 | 10.88 | 11.52 | 12.16 | 12.8 |
| 66 | 7.26 | 7.92 | 8.58 | 9.24 | 9.9 | 10.56 | 11.22 | 11.88 | 12.54 | 13.2 |
| 68 | 7.48 | 8.16 | 8.84 | 9.52 | 10.2 | 10.88 | 11.56 | 12.24 | 12.92 | 13.6 |
| 70 | 7.7 | 8.4 | 9.1 | 9.8 | 10.5 | 11.2 | 11.9 | 12.6 | 13.3 | 14 |
| 72 | 7.92 | 8.64 | 9.36 | 10.08 | 10.8 | 11.52 | 12.24 | 12.96 | 13.68 | 14.4 |
| 74 | 8.14 | 8.88 | 9.62 | 10.36 | 11.1 | 11.84 | 12.58 | 13.32 | 14.06 | 14.8 |
| 76 | 8.36 | 9.12 | 9.88 | 10.64 | 11.4 | 12.16 | 12.92 | 13.68 | 14.44 | 15.2 |
| 78 | 8.58 | 9.36 | 10.14 | 10.92 | 11.7 | 12.48 | 13.26 | 14.04 | 14.82 | 15.6 |
| 80 | 8.8 | 9.6 | 10.4 | 11.2 | 12 | 12.8 | 13.6 | 14.4 | 15.2 | 16 |
| 82 | 9.02 | 9.84 | 10.66 | 11.48 | 12.3 | 13.12 | 13.94 | 14.76 | 15.58 | 16.4 |
| 84 | 9.24 | 10.08 | 10.92 | 11.76 | 12.6 | 13.44 | 14.28 | 15.12 | 15.96 | 16.8 |
| 86 | 9.46 | 10.32 | 11.18 | 12.04 | 12.9 | 13.76 | 14.62 | 15.48 | 16.34 | 17.2 |
| 88 | 9.68 | 10.56 | 11.44 | 12.32 | 13.2 | 14.08 | 14.96 | 15.84 | 16.72 | 17.6 |
| 90 | 9.9 | 10.8 | 11.7 | 12.6 | 13.5 | 14.4 | 15.3 | 16.2 | 17.1 | 18 |

NUMBER OF DAYS

MEMMORY REQUIREMENTS (IN KILOBYTES) FOR 1 DENOMINATION

| FIG. 8A | FIG. 8B |
|---|---|

FIG. 8A

MAXIMUM NUMBER OF MAIL PIECES PER DAY

| | 5 | 10 | 15 | 20 | 25 | 30 | 35 | 40 | 45 | 50 |
|---|---|---|---|---|---|---|---|---|---|---|
| 10 | 0.2 | 0.4 | 0.6 | 0.8 | 1 | 1.2 | 1.4 | 1.6 | 1.8 | 2 |
| 12 | 0.24 | 0.48 | 0.72 | 0.96 | 1.2 | 1.44 | 1.68 | 1.92 | 2.16 | 2.4 |
| 14 | 0.28 | 0.56 | 0.84 | 1.12 | 1.4 | 1.68 | 1.96 | 2.24 | 2.52 | 2.8 |
| 16 | 0.32 | 0.64 | 0.96 | 1.28 | 1.6 | 1.96 | 2.24 | 2.56 | 2.88 | 3.2 |
| 18 | 0.36 | 0.72 | 1.08 | 1.44 | 1.8 | 2.16 | 2.52 | 2.88 | 3.24 | 3.6 |
| 20 | 0.4 | 0.8 | 1.2 | 1.6 | 2 | 2.4 | 2.8 | 3.2 | 3.6 | 4 |
| 22 | 0.44 | 0.88 | 1.32 | 1.76 | 2.2 | 2.64 | 3.08 | 3.52 | 3.96 | 4.4 |
| 24 | 0.48 | 0.96 | 1.44 | 1.92 | 2.4 | 2.88 | 3.36 | 3.84 | 4.32 | 4.8 |
| 26 | 0.52 | 1.04 | 1.56 | 2.08 | 2.6 | 3.12 | 3.64 | 4.16 | 4.68 | 5.2 |
| 28 | 0.56 | 1.12 | 1.68 | 2.24 | 2.8 | 3.36 | 3.92 | 4.48 | 5.04 | 5.6 |
| 30 | 0.6 | 1.2 | 1.8 | 2.4 | 3 | 3.6 | 4.2 | 4.8 | 5.4 | 6 |
| 32 | 0.64 | 1.28 | 1.92 | 2.56 | 3.2 | 3.84 | 4.48 | 5.12 | 5.76 | 6.4 |
| 34 | 0.68 | 1.36 | 2.04 | 2.72 | 3.4 | 4.08 | 4.76 | 5.44 | 6.12 | 6.8 |
| 36 | 0.72 | 1.44 | 2.16 | 2.88 | 3.6 | 4.32 | 5.04 | 5.76 | 6.48 | 7.2 |
| 38 | 0.76 | 1.52 | 2.28 | 3.04 | 3.8 | 4.56 | 5.32 | 6.08 | 6.84 | 7.6 |
| 40 | 0.8 | 1.6 | 2.4 | 3.2 | 4 | 4.8 | 5.6 | 6.4 | 7.2 | 8 |
| 42 | 0.84 | 1.68 | 2.52 | 3.36 | 4.2 | 5.04 | 5.88 | 6.72 | 7.56 | 8.4 |
| 44 | 0.88 | 1.76 | 2.64 | 3.52 | 4.4 | 5.28 | 6.16 | 7.04 | 7.92 | 8.8 |
| 46 | 0.92 | 1.84 | 2.76 | 3.68 | 4.6 | 5.52 | 6.44 | 7.36 | 8.28 | 9.2 |
| 48 | 0.96 | 1.92 | 2.88 | 3.84 | 4.8 | 5.76 | 6.72 | 7.68 | 8.64 | 9.6 |
| 50 | 1 | 2 | 3 | 4 | 5 | 6 | 7 | 8 | 9 | 10 |
| 52 | 1.04 | 2.08 | 3.12 | 4.16 | 5.2 | 6.24 | 7.28 | 8.32 | 9.36 | 10.4 |
| 54 | 1.08 | 2.16 | 3.24 | 4.32 | 5.4 | 6.48 | 7.56 | 8.64 | 9.72 | 10.8 |
| 56 | 1.12 | 2.24 | 3.36 | 4.48 | 5.6 | 6.72 | 7.84 | 8.96 | 10.08 | 11.2 |
| 58 | 1.16 | 2.32 | 3.48 | 4.64 | 5.8 | 6.96 | 8.12 | 9.28 | 10.44 | 11.6 |
| 60 | 1.2 | 2.4 | 3.6 | 4.8 | 6 | 7.2 | 8.4 | 9.6 | 10.8 | 12 |
| 62 | 1.24 | 2.48 | 3.72 | 4.96 | 6.2 | 7.44 | 8.68 | 9.92 | 11.16 | 12.4 |
| 64 | 1.28 | 2.56 | 3.84 | 5.12 | 6.4 | 7.68 | 8.96 | 10.24 | 11.52 | 12.8 |
| 66 | 1.32 | 2.64 | 3.96 | 5.28 | 6.6 | 7.92 | 9.24 | 10.56 | 11.88 | 13.2 |
| 68 | 1.36 | 2.72 | 4.08 | 5.44 | 6.8 | 8.16 | 9.52 | 10.88 | 12.24 | 13.6 |
| 70 | 1.4 | 2.8 | 4.2 | 5.6 | 7 | 8.4 | 9.8 | 11.2 | 12.6 | 14 |
| 72 | 1.44 | 2.88 | 4.32 | 5.76 | 7.2 | 8.64 | 10.08 | 11.52 | 12.96 | 14.4 |
| 74 | 1.48 | 2.96 | 4.44 | 5.92 | 7.4 | 8.88 | 10.36 | 11.84 | 13.32 | 14.8 |
| 76 | 1.52 | 3.04 | 4.56 | 6.08 | 7.6 | 9.12 | 10.64 | 12.16 | 13.68 | 15.2 |
| 78 | 1.56 | 3.12 | 4.68 | 6.24 | 7.8 | 9.36 | 10.92 | 12.48 | 14.04 | 15.6 |
| 80 | 1.6 | 3.2 | 4.8 | 6.4 | 8 | 9.6 | 11.2 | 12.8 | 14.4 | 16 |
| 82 | 1.64 | 3.28 | 4.92 | 6.56 | 8.2 | 9.84 | 11.48 | 13.12 | 14.76 | 16.4 |
| 84 | 1.68 | 3.36 | 5.04 | 6.72 | 8.4 | 10.08 | 11.76 | 13.44 | 15.12 | 16.8 |
| 86 | 1.72 | 3.44 | 5.16 | 6.88 | 8.6 | 10.32 | 12.04 | 13.76 | 15.48 | 17.2 |
| 88 | 1.76 | 3.52 | 5.28 | 7.04 | 8.8 | 10.56 | 12.32 | 14.08 | 15.84 | 17.6 |
| 90 | 1.8 | 3.6 | 5.4 | 7.2 | 9 | 10.8 | 12.6 | 14.4 | 16.2 | 18 |

NUMBER OF DAYS

MEMORY REQUIREMENTS (IN KILOBYTES) FOR 2 DENOMINATION

FIG. 8B

MAXIMUM NUMBER OF MAIL PIECES PER DAY

| | 55 | 60 | 65 | 70 | 75 | 80 | 85 | 90 | 95 | 100 |
|---|---|---|---|---|---|---|---|---|---|---|
| 10 | 2.2 | 2.4 | 2.6 | 2.8 | 3 | 3.2 | 3.4 | 3.6 | 3.8 | 4 |
| 12 | 2.64 | 2.88 | 3.12 | 3.36 | 3.6 | 3.84 | 4.08 | 4.32 | 4.56 | 4.8 |
| 14 | 3.08 | 3.36 | 3.64 | 3.92 | 4.2 | 4.48 | 4.76 | 5.04 | 5.32 | 5.6 |
| 16 | 3.52 | 3.84 | 4.16 | 4.48 | 4.8 | 5.12 | 5.44 | 5.76 | 6.08 | 6.4 |
| 18 | 3.96 | 4.32 | 4.68 | 5.04 | 5.4 | 5.76 | 6.12 | 6.48 | 6.84 | 7.2 |
| 20 | 4.4 | 4.8 | 5.2 | 5.6 | 6 | 6.4 | 6.8 | 7.2 | 7.6 | 8 |
| 22 | 4.84 | 5.28 | 5.72 | 6.16 | 6.6 | 7.04 | 7.48 | 7.92 | 8.36 | 8.8 |
| 24 | 5.28 | 5.76 | 6.24 | 6.72 | 7.2 | 7.68 | 8.16 | 8.64 | 9.12 | 9.6 |
| 26 | 5.72 | 6.24 | 6.76 | 7.28 | 7.8 | 8.32 | 8.84 | 9.36 | 9.88 | 10.4 |
| 28 | 6.16 | 6.72 | 7.28 | 7.84 | 8.4 | 8.96 | 9.52 | 10.08 | 10.64 | 11.2 |
| 30 | 6.6 | 7.2 | 7.8 | 8.4 | 9 | 9.6 | 10.2 | 10.8 | 11.4 | 12 |
| 32 | 7.04 | 7.68 | 8.32 | 8.96 | 9.6 | 10.24 | 10.88 | 11.52 | 12.16 | 12.8 |
| 34 | 7.48 | 8.16 | 8.84 | 9.52 | 10.2 | 10.88 | 11.56 | 12.24 | 12.92 | 13.6 |
| 36 | 7.92 | 8.64 | 9.36 | 10.08 | 10.8 | 11.52 | 12.24 | 12.96 | 13.68 | 14.4 |
| 38 | 8.36 | 9.12 | 9.88 | 10.64 | 11.4 | 12.16 | 12.92 | 13.68 | 14.44 | 15.2 |
| 40 | 8.8 | 9.6 | 10.4 | 11.2 | 12 | 12.8 | 13.6 | 14.4 | 15.2 | 16 |
| 42 | 9.24 | 10.08 | 10.92 | 11.76 | 12.6 | 13.44 | 14.28 | 15.12 | 15.96 | 16.8 |
| 44 | 9.68 | 10.56 | 11.44 | 12.32 | 13.2 | 14.08 | 14.96 | 15.84 | 16.72 | 17.6 |
| 46 | 10.12 | 11.04 | 11.96 | 12.88 | 13.8 | 14.72 | 15.64 | 16.56 | 17.48 | 18.4 |
| 48 | 10.56 | 11.52 | 12.48 | 13.44 | 14.4 | 15.36 | 16.32 | 17.28 | 18.24 | 19.2 |
| 50 | 11 | 12 | 13 | 14 | 15 | 16 | 17 | 18 | 19 | 20 |
| 52 | 11.44 | 12.48 | 13.52 | 14.56 | 15.6 | 16.64 | 17.68 | 18.72 | 19.76 | 20.8 |
| 54 | 11.88 | 12.96 | 14.04 | 15.12 | 16.2 | 17.28 | 18.36 | 19.44 | 20.52 | 21.6 |
| 56 | 12.32 | 13.44 | 14.56 | 15.68 | 16.8 | 17.92 | 19.04 | 20.16 | 21.28 | 22.4 |
| 58 | 12.76 | 13.92 | 15.08 | 16.24 | 17.4 | 18.56 | 19.72 | 20.88 | 22.04 | 23.2 |
| 60 | 13.2 | 14.4 | 15.6 | 16.8 | 18 | 19.2 | 20.4 | 21.6 | 22.8 | 24 |
| 62 | 13.64 | 14.88 | 16.12 | 17.36 | 18.6 | 19.84 | 21.08 | 22.32 | 23.56 | 24.8 |
| 64 | 14.08 | 15.36 | 16.64 | 17.92 | 19.2 | 20.48 | 21.76 | 23.04 | 24.32 | 25.6 |
| 66 | 14.52 | 15.84 | 17.16 | 18.48 | 19.8 | 21.12 | 22.44 | 23.76 | 25.08 | 26.4 |
| 68 | 14.96 | 16.32 | 17.68 | 19.04 | 20.4 | 21.76 | 23.12 | 24.48 | 25.84 | 27.2 |
| 70 | 15.4 | 16.8 | 18.2 | 19.6 | 21 | 22.4 | 23.8 | 25.2 | 26.6 | 28 |
| 72 | 15.84 | 17.28 | 18.72 | 20.16 | 21.6 | 23.04 | 24.48 | 25.92 | 27.36 | 28.8 |
| 74 | 16.28 | 17.76 | 19.24 | 20.72 | 22.2 | 23.68 | 25.16 | 26.64 | 28.12 | 29.6 |
| 76 | 16.72 | 18.24 | 19.76 | 21.28 | 22.8 | 24.32 | 25.84 | 27.36 | 28.88 | 30.4 |
| 78 | 17.16 | 18.72 | 20.28 | 21.84 | 23.4 | 24.96 | 26.52 | 28.08 | 29.64 | 31.2 |
| 80 | 17.6 | 19.2 | 20.8 | 22.4 | 24 | 25.6 | 27.2 | 28.8 | 30.4 | 32 |
| 82 | 18.04 | 19.68 | 21.32 | 22.96 | 24.6 | 26.24 | 27.88 | 29.52 | 31.16 | 32.8 |
| 84 | 18.48 | 20.16 | 21.84 | 23.52 | 25.2 | 26.88 | 28.56 | 30.24 | 31.92 | 35.6 |
| 86 | 18.92 | 20.64 | 22.36 | 24.08 | 25.8 | 27.52 | 29.24 | 30.96 | 32.68 | 34.4 |
| 88 | 19.36 | 21.12 | 22.88 | 24.64 | 26.4 | 28.16 | 29.92 | 31.68 | 33.44 | 35.2 |
| 90 | 19.8 | 21.6 | 23.4 | 25.2 | 27 | 28.8 | 30.6 | 32.4 | 34.2 | 36 |

NUMBER OF DAYS

MEMORY REQUIREMENTS (IN KILOBYTES) FOR 2 DENOMINATION

| FIG. 9A | FIG. 9B |

FIG. 9A

MAXIMUM NUMBER OF MAIL PIECES PER DAY

| | 5 | 10 | 15 | 20 | 25 | 30 | 35 | 40 | 45 | 50 |
|---|---|---|---|---|---|---|---|---|---|---|
| 10 | 0.3 | 0.6 | 0.9 | 1.2 | 1.5 | 1.8 | 2.1 | 2.4 | 2.7 | 3 |
| 12 | 0.36 | 0.72 | 1.08 | 1.44 | 1.8 | 2.16 | 2.52 | 2.88 | 3.24 | 3.6 |
| 14 | 0.42 | 0.84 | 1.26 | 1.68 | 2.1 | 2.52 | 2.94 | 3.36 | 3.78 | 4.2 |
| 16 | 0.48 | 0.96 | 1.44 | 1.92 | 2.4 | 2.88 | 3.36 | 3.84 | 4.32 | 4.8 |
| 18 | 0.54 | 1.08 | 1.62 | 2.16 | 2.7 | 3.24 | 3.78 | 4.32 | 4.86 | 5.4 |
| 20 | 0.6 | 1.2 | 1.8 | 2.4 | 3 | 3.6 | 4.2 | 4.8 | 5.4 | 6 |
| 22 | 0.66 | 1.32 | 1.98 | 2.64 | 3.3 | 3.96 | 4.62 | 5.28 | 5.94 | 6.6 |
| 24 | 0.72 | 1.44 | 2.16 | 2.88 | 3.6 | 4.32 | 5.04 | 5.76 | 6.48 | 7.2 |
| 26 | 0.78 | 1.56 | 2.34 | 3.12 | 3.9 | 4.68 | 5.46 | 6.24 | 7.02 | 7.8 |
| 28 | 0.84 | 1.68 | 2.52 | 3.36 | 4.2 | 5.04 | 5.88 | 6.72 | 7.56 | 8.4 |
| 30 | 0.9 | 1.8 | 2.7 | 3.6 | 4.5 | 5.4 | 6.3 | 7.2 | 8.1 | 9 |
| 32 | 0.96 | 1.92 | 2.88 | 3.84 | 4.8 | 5.76 | 6.72 | 7.68 | 8.64 | 9.6 |
| 34 | 1.02 | 2.04 | 3.06 | 4.08 | 5.1 | 6.12 | 7.14 | 8.16 | 9.18 | 10.2 |
| 36 | 1.08 | 2.16 | 3.24 | 4.32 | 5.4 | 6.48 | 7.56 | 8.64 | 9.72 | 10.8 |
| 38 | 1.14 | 2.28 | 3.42 | 4.56 | 5.7 | 6.84 | 7.98 | 9.12 | 10.26 | 11.4 |
| 40 | 1.2 | 2.4 | 3.6 | 4.8 | 6 | 7.2 | 8.4 | 9.6 | 10.8 | 12 |
| 42 | 1.26 | 2.52 | 3.78 | 5.04 | 6.3 | 7.56 | 8.82 | 10.08 | 11.34 | 12.6 |
| 44 | 1.32 | 2.64 | 3.96 | 5.28 | 6.6 | 7.92 | 9.24 | 10.56 | 11.88 | 13.2 |
| 46 | 1.38 | 2.76 | 4.14 | 5.52 | 6.9 | 8.28 | 9.66 | 11.04 | 12.42 | 13.8 |
| 48 | 1.44 | 2.88 | 4.32 | 5.76 | 7.2 | 8.64 | 10.08 | 11.52 | 12.96 | 14.4 |
| 50 | 1.5 | 3 | 4.5 | 6 | 7.5 | 9 | 10.5 | 12 | 13.5 | 15 |
| 52 | 1.56 | 3.12 | 4.68 | 6.24 | 7.8 | 9.36 | 10.92 | 12.48 | 14.04 | 15.6 |
| 54 | 1.62 | 3.24 | 4.86 | 6.48 | 8.1 | 9.72 | 11.34 | 12.96 | 14.58 | 16.2 |
| 56 | 1.68 | 3.36 | 5.04 | 6.72 | 8.4 | 10.08 | 11.76 | 13.44 | 15.12 | 16.8 |
| 58 | 1.74 | 3.48 | 5.22 | 6.96 | 8.7 | 10.44 | 12.18 | 13.92 | 15.66 | 17.4 |
| 60 | 1.8 | 3.6 | 5.4 | 7.2 | 9 | 10.8 | 12.6 | 14.4 | 16.2 | 18 |
| 62 | 1.86 | 3.72 | 5.58 | 7.44 | 9.3 | 11.16 | 13.02 | 14.88 | 16.74 | 18.6 |
| 64 | 1.92 | 3.84 | 5.76 | 7.68 | 9.6 | 11.52 | 13.44 | 15.36 | 17.28 | 19.2 |
| 66 | 1.98 | 3.96 | 5.94 | 7.92 | 9.9 | 11.88 | 13.86 | 15.84 | 17.82 | 19.8 |
| 68 | 2.04 | 4.08 | 6.12 | 8.16 | 10.2 | 12.24 | 14.28 | 16.32 | 18.36 | 20.4 |
| 70 | 2.1 | 4.2 | 6.3 | 8.4 | 10.5 | 12.6 | 14.7 | 16.8 | 18.9 | 21 |
| 72 | 2.16 | 4.32 | 6.48 | 8.64 | 10.8 | 12.96 | 15.12 | 17.28 | 19.44 | 21.6 |
| 74 | 2.22 | 4.44 | 6.66 | 8.88 | 11.1 | 13.32 | 15.54 | 17.76 | 19.98 | 22.2 |
| 76 | 2.28 | 4.56 | 6.84 | 9.12 | 11.4 | 13.68 | 15.96 | 18.24 | 20.52 | 22.8 |
| 78 | 2.34 | 4.68 | 7.02 | 9.36 | 11.7 | 14.04 | 16.38 | 18.72 | 21.06 | 23.4 |
| 80 | 2.4 | 4.8 | 7.2 | 9.6 | 12 | 14.4 | 16.8 | 19.2 | 21.6 | 24 |
| 82 | 2.46 | 4.92 | 7.38 | 9.84 | 12.3 | 14.76 | 17.22 | 19.68 | 22.14 | 24.6 |
| 84 | 2.52 | 5.04 | 7.56 | 10.08 | 12.6 | 15.12 | 17.64 | 20.16 | 22.68 | 25.2 |
| 86 | 2.58 | 5.16 | 7.74 | 10.32 | 12.9 | 15.48 | 18.06 | 20.64 | 23.22 | 25.8 |
| 88 | 2.64 | 5.28 | 7.92 | 10.56 | 13.2 | 15.84 | 18.48 | 21.12 | 23.76 | 26.4 |
| 90 | 2.7 | 5.4 | 8.1 | 10.8 | 13.5 | 16.2 | 18.9 | 21.6 | 24.3 | 27 |

NUMBER OF DAYS (row labels)

MEMORY REQUIREMENTS (IN KILOBYTES) FOR 3 DENOMINATION

FIG. 9B

MAXIMUM NUMBER OF MAIL PIECES PER DAY

| NUMBER OF DAYS | 55 | 60 | 65 | 70 | 75 | 80 | 85 | 90 | 95 | 100 |
|---|---|---|---|---|---|---|---|---|---|---|
| 10 | 3.3 | 3.6 | 3.9 | 4.2 | 4.5 | 4.8 | 5.1 | 5.4 | 5.7 | 6 |
| 12 | 3.96 | 4.32 | 4.68 | 5.04 | 5.4 | 5.76 | 6.12 | 6.48 | 6.84 | 7.2 |
| 14 | 4.62 | 5.04 | 5.46 | 5.88 | 6.3 | 6.72 | 7.14 | 7.56 | 7.98 | 8.4 |
| 16 | 5.28 | 5.76 | 6.24 | 6.72 | 7.2 | 7.68 | 8.16 | 8.64 | 9.12 | 9.6 |
| 18 | 5.94 | 6.48 | 7.02 | 7.56 | 8.1 | 8.64 | 9.18 | 9.72 | 10.26 | 10.8 |
| 20 | 6.6 | 7.2 | 7.8 | 8.4 | 9 | 9.6 | 10.2 | 10.8 | 11.4 | 12 |
| 22 | 7.26 | 7.92 | 8.58 | 9.24 | 9.9 | 10.56 | 11.22 | 11.88 | 12.54 | 13.2 |
| 24 | 7.92 | 8.64 | 9.36 | 10.08 | 10.8 | 11.52 | 12.24 | 12.96 | 13.68 | 14.4 |
| 26 | 8.58 | 9.36 | 10.14 | 10.92 | 11.7 | 12.48 | 13.26 | 14.04 | 14.82 | 15.6 |
| 28 | 9.24 | 10.08 | 10.92 | 11.76 | 12.6 | 13.44 | 14.28 | 15.12 | 15.96 | 16.8 |
| 30 | 9.9 | 10.8 | 11.7 | 12.6 | 13.5 | 14.4 | 15.3 | 16.2 | 17.1 | 18 |
| 32 | 10.56 | 11.52 | 12.48 | 13.44 | 14.4 | 15.36 | 16.32 | 17.28 | 18.24 | 19.2 |
| 34 | 11.22 | 12.24 | 13.26 | 14.28 | 15.3 | 16.32 | 17.34 | 18.36 | 19.38 | 20.4 |
| 36 | 11.88 | 12.96 | 14.04 | 15.12 | 16.2 | 17.28 | 18.36 | 19.44 | 20.52 | 21.6 |
| 38 | 12.54 | 13.68 | 14.82 | 15.96 | 17.1 | 18.24 | 19.38 | 20.52 | 21.66 | 22.8 |
| 40 | 13.2 | 14.4 | 15.6 | 16.8 | 18 | 19.2 | 20.4 | 21.6 | 22.8 | 24 |
| 42 | 13.86 | 15.12 | 16.38 | 17.64 | 18.9 | 20.16 | 21.42 | 22.68 | 23.94 | 25.2 |
| 44 | 14.52 | 15.84 | 17.16 | 18.48 | 19.8 | 21.12 | 22.44 | 23.76 | 25.08 | 26.4 |
| 46 | 15.18 | 16.56 | 17.94 | 19.32 | 20.7 | 22.08 | 23.46 | 24.84 | 26.22 | 27.6 |
| 48 | 15.84 | 17.28 | 18.72 | 20.16 | 21.6 | 23.04 | 24.48 | 25.92 | 27.36 | 28.8 |
| 50 | 16.5 | 18 | 19.5 | 21 | 22.5 | 24 | 25.5 | 27 | 28.5 | 30 |
| 52 | 17.16 | 18.72 | 20.28 | 21.84 | 23.4 | 24.96 | 26.52 | 28.08 | 29.64 | 31.2 |
| 54 | 17.82 | 19.44 | 21.06 | 22.68 | 24.3 | 25.92 | 27.54 | 29.16 | 30.78 | 32.4 |
| 56 | 18.48 | 20.16 | 21.84 | 23.52 | 25.2 | 26.88 | 28.56 | 30.24 | 31.92 | 33.6 |
| 58 | 19.14 | 20.88 | 22.62 | 24.36 | 26.1 | 27.84 | 29.58 | 31.32 | 33.06 | 34.8 |
| 60 | 19.8 | 21.6 | 23.4 | 25.2 | 27 | 28.8 | 30.6 | 32.4 | 34.2 | 36 |
| 62 | 20.46 | 22.32 | 24.18 | 26.04 | 27.9 | 29.76 | 31.62 | 33.48 | 35.34 | 37.2 |
| 64 | 21.12 | 23.04 | 24.96 | 26.88 | 28.8 | 30.72 | 32.64 | 34.56 | 36.48 | 38.4 |
| 66 | 21.78 | 23.76 | 25.74 | 27.72 | 29.7 | 31.68 | 33.66 | 35.64 | 37.62 | 39.6 |
| 68 | 22.44 | 24.48 | 26.52 | 28.56 | 30.6 | 32.64 | 34.68 | 36.72 | 38.76 | 40.8 |
| 70 | 23.1 | 25.2 | 27.3 | 29.4 | 31.5 | 33.6 | 35.7 | 37.8 | 39.9 | 42 |
| 72 | 23.76 | 25.92 | 28.08 | 30.24 | 32.4 | 34.56 | 36.72 | 38.88 | 41.04 | 43.2 |
| 74 | 24.42 | 26.64 | 28.86 | 31.08 | 33.3 | 35.52 | 37.74 | 39.96 | 42.18 | 44.4 |
| 76 | 25.08 | 27.36 | 29.64 | 31.92 | 34.2 | 36.48 | 38.76 | 41.04 | 43.32 | 45.6 |
| 78 | 25.74 | 28.08 | 30.42 | 32.76 | 35.1 | 37.44 | 39.78 | 42.12 | 44.46 | 46.8 |
| 80 | 26.4 | 28.8 | 31.2 | 33.6 | 36 | 38.4 | 40.8 | 43.2 | 45.6 | 48 |
| 82 | 27.06 | 29.52 | 31.98 | 34.44 | 36.9 | 39.36 | 41.82 | 44.28 | 46.74 | 49.2 |
| 84 | 27.72 | 30.24 | 32.76 | 35.28 | 37.8 | 40.32 | 42.84 | 45.36 | 47.88 | 50.4 |
| 86 | 28.38 | 30.96 | 33.54 | 36.12 | 38.7 | 41.28 | 43.86 | 46.44 | 49.02 | 51.6 |
| 88 | 29.04 | 31.68 | 34.32 | 36.96 | 39.6 | 42.24 | 44.88 | 47.52 | 50.16 | 52.8 |
| 90 | 29.7 | 32.4 | 35.1 | 37.8 | 40.5 | 43.2 | 45.9 | 48.6 | 51.3 | 54 |

MEMORY REQUIREMENTS (IN KILOBYTES) FOR 3 DENOMINATION

5,655,023

1

ADVANCED POSTAGE PAYMENT SYSTEM EMPLOYING PRE-COMPUTED DIGITAL TOKENS AND WITH ENHANCED SECURITY

FIELD OF THE INVENTION

The present invention relates to advanced postage payment systems and, more particularly, to advanced postage payment systems having pre-computed postage payment information.

BACKGROUND OF THE INVENTION

Postage metering systems print and account for postage and other unit value printing such as parcel delivery service charges and tax stamps. These systems have been both electronic and mechanical. Some of the varied types of postage metering systems are shown, for example, in U.S. Pat. No. 3,978,457 for MICROCOMPUTERIZED ELECTRONIC POSTAGE METER SYSTEM, issued Aug. 31, 1976; U.S. Pat. No. 4,301,507 for ELECTRONIC POSTAGE METER HAVING PLURAL COMPUTING SYSTEMS, issued Nov. 17, 1981; and, U.S. Pat. No. 4,579,054 for STAND ALONE ELECTRONIC MAILING MACHINE, issued Apr. 1, 1986. Moreover, other types of metering systems have been developed which involve different printing systems such as those employing thermal printers, ink jet printers, mechanical printers and other types of printing technologies. Examples of these other types of electronic postage meter are described in U.S. Pat. No. 4,168,533 for MICROCOMPUTER MINIATURE POSTAGE METER, issued Sep. 18, 1979; and, U.S. Pat. No. 4,493,252 for POSTAGE PRINTING APPARATUS HAVING A REMOVABLE PRINT HEAD AND A PRINT DRUM, issued Jan. 15, 1985. These printing systems enable the postage meter system to print variable information which may be alphanumeric and graphic type of information.

Card controlled metering systems have also been developed. These systems have employed both magnetic strip type cards and microprocessor based cards. Examples of card controlled metering systems employing magnetic type cards include U.S. Pat. No. 4,222,518 for METERING SYSTEM, issued Sep. 16, 1980; U.S. Pat. No. 4,226,360 for METERING SYSTEM, issued Oct. 7, 1980; and, U.S. Pat. No. 4,629,871 for ELECTRONIC POSTAGE METER SYSTEM SETTABLE BY MEANS OF A REMOTELY GENERATED INPUT DEVICE, issued Dec. 16, 1986. A microprocessor ("smart card") based card metering system providing an automated transaction system employing microprocessor bearing user cards issued to respective users is disclosed in U.S. Pat. No. 4,900,903 for AUTOMATED TRANSACTION SYSTEM WITH INSERTABLE CARDS FOR TRANSFERRING ACCOUNT DATA, issued Feb. 13, 1990. Moreover, systems have also been developed wherein a unit having a non-volatile read/write memory which may consist of a EEPROM is employed. One such system is disclosed in U.S. Pat. No. 4,757,532 for SECURE TRANSPORT OF INFORMATION BETWEEN ELECTRONIC STATIONS, issued Jul. 12, 1988 and U.S. Pat. No. 4,907,271 for SECURE TRANSMISSION OF INFORMATION BETWEEN ELECTRONIC STATIONS, issued Mar. 6, 1990.

Postage metering systems have also been developed which employ encrypted information printed on a mail piece. The postage value for a mail piece may be encrypted together with other data to generate a digital token. A digital token is encrypted information that authenticates the information imprinted on a mail piece including postage values.

2

Examples of postage metering systems which generate and employ digital tokens are described in U.S. Pat. No. 4,757,537 for SYSTEM FOR DETECTING UNACCOUNTED FOR PRINTING IN A VALUE PRINTING SYSTEM, issued Jul. 12, 1988; U.S. Pat. No. 4,831,555 for SECURE POSTAGE APPLYING SYSTEM, issued May 16, 1989; U.S. Pat. No. 4,775,246 for SYSTEM FOR DETECTING UNACCOUNTED FOR PRINTING IN A VALUE PRINTING SYSTEM, issued Oct. 4, 1988; U.S. Pat. No. 4,873,645 for SECURE POSTAGE DISPENSING SYSTEM, issued Oct. 10, 1989; and, U.S. Pat. No. 4,725,718 for POSTAGE AND MAILING INFORMATION APPLYING SYSTEM, issued Feb. 16, 1988.

These systems, which may utilize a device termed a postage evidencing device (PED), employ an encryption algorithm which is employed to encrypt selected information to generate the digital token. The encryption of the information provides security to prevent altering of the printed information in a manner such that any change in the postal revenue block is detectable by appropriate verification procedures.

Typical information which may be encrypted as part of a digital token includes the value of the imprint, the origination zip code, the recipient addressee information (or zip code), the date and a piece count number. These items of information when encrypted with a secret key and imprinted on a mail piece provide a very high level of security which enables the detection of any attempted modification of the postal revenue block, where this information may be imprinted both in encrypted and unencrypted form. These digital token systems can be utilized with both a dedicated printer, that is, a printer that is securely coupled to an accounting module such that printing cannot take place without accounting or in systems employing non-dedicated printers and secure accounting system. In this case, the non-dedicated printer may print the digital token as well as have other utility and be employed to print other information.

Digital tokens need to be computed and printed in the postal revenue block for each mail piece. The digital token transformation (DTT) computation requires a secret key, that has to be protected and updated. One of the more difficult problems with encrypted evidence of postage payment is the key management problem. Indeed, the use two digital tokens (postal and vendor) is described in pending U.S. patent application of Jose Pastor, George M. Brooknet, Robert A. Cordery and Hyung-Kun Kim, Ser. No. 08/133,427 filed Oct. 8, 1993 for MAIL PROCESSING SYSTEM INCLUDING DATA CENTER VERIFICATION FOR MAILPIECES and assigned to Pitney Bowes Inc., the entire disclosure of which is hereby incorporated by reference, now U.S. Pat. No. 5,390,251. In such systems, the digital tokens are usually computed for every mail piece processed. This computation involves taking input data such as piece count, date, origination postal code and postage amount and encrypting this data with secret keys shared by the postage evidencing device (PED) and postal or courier service and by the postage evidencing device and device manufacturer or vendor. This sharing requires coordination of key updates, key protection and other measures commonly referred to as a key management system. The computation of digital tokens takes place upon request to generate tokens by a mailer. This computation is performed by the postage evidencing device. Thus, the postage evidencing device needs to have all the information required for computation, and, most significantly encryption keys. Moreover, refilling the postage evidencing device with additional postage funds also requires separate keys and a management process. In these systems, the process of token generation is accomplished with real time token computation and tokens can be computed for any combination of input parameters allowed by the system.

SUMMARY OF THE INVENTION

It has been discovered that a system can be provided with a great flexibility and enhanced security while enabling a user to employ a system which prints digital tokens.

It has been further discovered that a system can be created which provides protection of the encryption algorithm and secret keys employed to generate digital tokens.

Still further, it has been also discovered that is possible to implement a postage metering system which utilizes digital tokens and greatly limits the potential compromise of postal funds by unauthorized activity.

The present invention allows for enhanced security such that the security requirements may be modified to meet the reduced potential financial exposure from unauthorized activity by employing pre-computed digital tokens which are stored for subsequent use. The pre-computed digital tokens may have the value of the token and other data encrypted and thereafter stored for later retrieval and use in a portable storage medium. The use of pre-computed digital tokens on a portable storage medium enables the utilization of the digital token technology without the risk of compromise of the encryption algorithm or the encryption key since they are not resident in the portable storage medium. This eliminates a major disadvantage and burden of secret key protection and management.

Utilization of pre-computed digital tokens stored in a secure portable storage medium may reduce or eliminate the need for physical inspection (either by direct physical access to view and/or test the metering device in question or by means of remote inspection such as over telephone lines). In many countries, in North America in particular, postage evidencing devices, specifically postage meters, cannot be sold. They have to be leased by mailers. By regulation, the leasing arrangement is required to allow posts and manufacturers to perform regular inspection of meters in order to help prevent and/or detect unauthorized tampering. These inspections are done regularly, usually two times a year, and represent a significant expense to both posts and manufacturers. The present invention by limiting the potential risk of loss of postal funds, minimizes and if desired, avoids the need for inspections. This is because tampering with the device does not provide any advantage other than access to the pre-computed digital tokens stored therein.

The present invention also provides a distinct advantage over postal stamps for both mailers and posts. The postage evidencing device system that utilizes pre-computed digital tokens of the present invention is secure against counterfeiting by employing digital tokens produced by encryption, while providing higher flexibility and convenience to mailers and providing the advantages that postage meters provide over stamps.

In accordance with the present invention, a plurality of dispensable discrete items of encrypted data are generated, each of the items of encrypted data having a specific value. The generated plurality of discrete items of encrypted data are stored on a portable medium. A prepayment value is also stored on the portable medium. The stored plurality of discrete items of encrypted data which are dispensable is limited based on the prepayment value stored on the portable medium.

In accordance with a feature of the present invention, the portable storage device includes memory means for storing a plurality of dispensable digital tokens. Each of the plurality of digital tokens have a specific value. Means account for digital tokens dispensed from the memory means.

In accordance with another feature of the present invention, the portable member or device may have a housing means with a register means within the housing. A postage prepayment value is stored in the register. A plurality of discrete items of encrypted data is also stored in the housing. Each of the items of encrypted data are adapted to be formatted for printing. Each of the encrypted items of data have a specific value. Means within the housing are coupled to the plurality of discrete items of encrypted data and to the prepayment register for enabling a selected item of encrypted data to be communicated outside of the housing if the value stored in the register is at least equal to the specific value of the selected item of encrypted data.

BRIEF DESCRIPTION OF THE DRAWINGS

A complete understanding of the present invention may be obtained from the following detailed description of the preferred embodiment thereof, when taken in conjunction with the accompanying drawings, wherein like reference numerals designate similar elements in the various figures, and in which.

DETAILED DESCRIPTION OF THE PREFERRED EMBODIMENT

Figure 1:
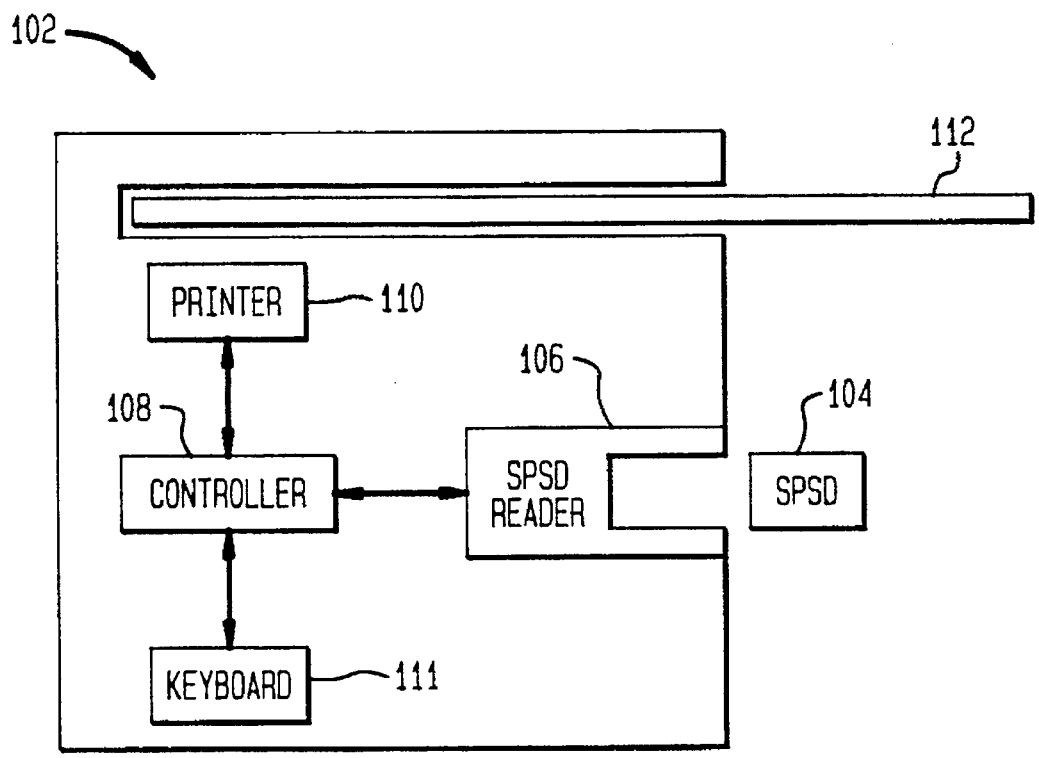
FIG. 1 is a block diagram of an advanced postage payment system employing pre-computed digital tokens and embodying the present invention.

A system is provided for evidencing postal payment utilizing digital tokens where token computation is to be performed off-line. That is, the system pre-computes all the tokens that may be required within a certain pre-specified period of time and stores them in storage media such as a smart card or CD-ROM, or read only NVM or any other suitable device. The storage media may be protected against tampering. In this case, the postage evidencing device that performs printing of the evidence of postage need not have stored therein or have access to any secret keys, with the exception, if desired, of session keys needed for accessing information from protected tokens storage. Session keys, which are not described herein, are used for only one particular communication session. Such keys are described in Applied Cryptography by Bruce Schneier, published by John Wiley and Sons, Inc., 1994. In the system, the postage evidencing device has to insure that the appropriate amount of postage value is subtracted from a prepaid postage register every time a pair of tokens is extracted from the memory (or protected storage area) where the pre-computed digital tokens are stored. The key management in this system is thus greatly simplified. Moreover, the overall security of the system as measured by the postal exposure (irrecoverable loss of revenue by a post due to unauthorized or fraudulent use of the system) is greatly reduced.

In the case of pre-computed tokens, which more generically are a plurality of dispensable discrete items of encrypted data, stored in the storage media, the postal exposure is limited to the total amount associated with all the tokens stored. Thus, if the storage device stores 2,000 pairs of tokens for the first class 1 oz mail having a $0.29 value, the total exposure to the post would be limited to $580 (2,000×$0.29). The alternative arrangement when the postage evidencing device performs calculation of tokens in real time may require a master secret key that is used to generate and update other keys involved. A compromise of such master key could theoretically, absent other protection, expose the post to a potential problem in revenue protection.

Since the number of all possible combinations of input parameters to the digital token transformation (encryption algorithm) is quite large, an unjustifiable and uneconomically large tokens storage would be required for all possible combinations. The present invention reduces the storage requirement. The system limits the possible combinations of parameters, for example by not allowing certain postage denominations and reducing the number of tokens that can be retrieved on a given date. Alternatively, the system can exclude date data from the digital token transformation, but separately encrypt the date with a separate resident key on the portable storage medium that does not have to change. However, this will make the key management process more complicated. Thus, the system described below utilizes a reduction in the number of parameter combinations while providing great flexibility to the mailer and greater protection to the Postal Service.

Reference is now made to FIG. 1. An advanced postage payment system 102 employs pre-computed digital tokens stored on a secure portable storage medium or device 104. The secure portable storage device 104 may be a portable device having a microprocessor and non-volatile memory along with various peripheral components. Such portable devices are often termed "smart cards". The portable medium is a housing which is secure in the sense that the information stored in the card is protected against unauthorized access. The levels of security vary with design and user requirements. The security may involve leaving physical indications of attempts to gain physical access such as by delamination of the card and/or shielding for physical and electromagnetic security. Electronic security may be provided by erasure of all or some of the digital tokens stored in the secure portable storage device if attempted electrical penetrations or physical attack is detected and/or altering the digital tokens in a manner to later flag (with or without decryption) of the attempted electronic penetration or physical attack. This portable secure device or medium 104 is described in greater detail in connection with FIG. 3.

The advanced postage payment system 102 includes a secure portable storage device reader 106 adapted to receive the device 104 and read data from the device. A controller 108 is operatively coupled between the reader 106 and a printer 110. In response to data entry to the controller, such as from a keyboard 111 the secure portable storage device reader 106 retrieves information from the secure portable storage device 104, such as digital tokens to be printed, and passes the data to the printer 110 to be printed on a mail piece 112 as is shown in FIG. 2.

Figure 2:
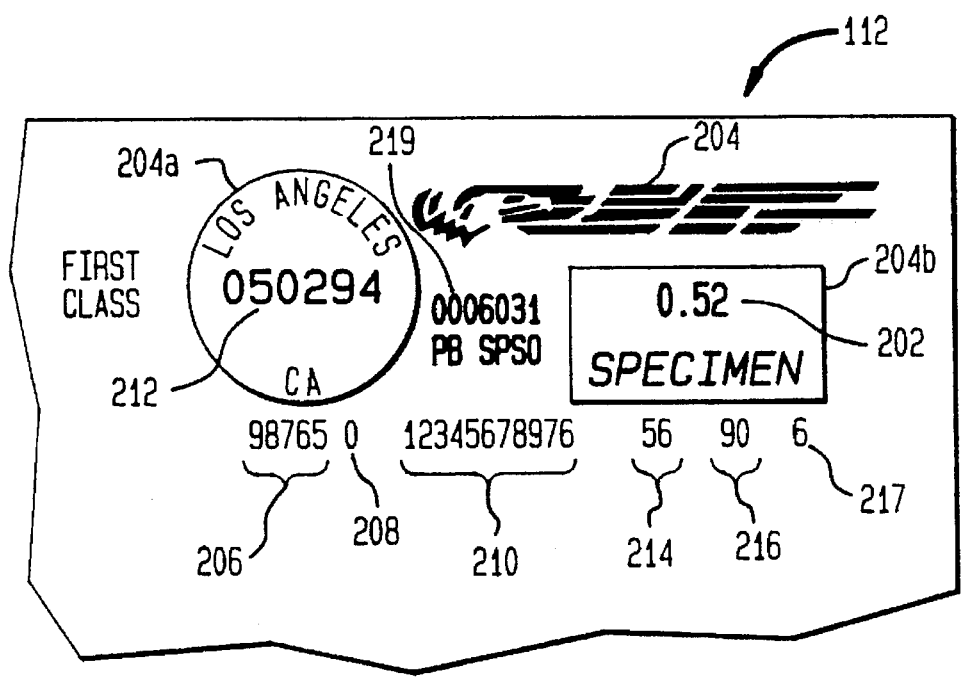
FIG. 2 is a mail piece having a pre-computed digital token printed thereon and helpful in understanding the present invention.

Reference is now made to FIG. 2. The information printed on the envelope 112 includes the information obtained by the controller 108 from the secure portable storage device 104 and sent to the printer 110. A postage amount 202, here $0.52, is printed along, if desired, with a graphic indicia 204. The indicia graphics may be associated with a particular advanced postage payment system manufacturer. The pedicular indicia shown is an eagle design. The indicia graphics may also include the town origin circle 204a, the graphical information around the postage amount 204b and any other graphic information desired to be imprinted on the mail piece. The indicia 204 may be either stored in the controller 108 or, if desired, on the secure portable storage device 104. Since the graphical portion of the indicia 204 does not include security information, it can be stored either in the controller 108 or the printer 110 (if it has a memory capability) or the secure portable storage device 104, depending upon the system design.

An originating Postal Office code 206 for the originating post office is imprinted. This Originating Postal Office Code is also stored on the secure portable storage device 104 and is utilized and corresponds to the graphical information printed at 204a. It should be recognized that although it is highly desirable from a security point of view to include an originating postal office code 206 on the secure portable storage device 104, if this level of security is not needed, this information may be stored in the controller 108 or the printer 110. Nonetheless, whether or not obtained from the card for imprinting, this information may be encrypted into the printed information on the mail piece or into the digital tokens.

Also printed on the mail piece 112 is the Vendor Identification Code 208. This information may be the leading digit, of the Secure Portable Storage Device Identification 210. The Vendor Identification and Secure Portable Storage Device Identification are stored within the portable device 104. The Date of Submission 212 is printed and must correspond to the particular digital tokens 214 (Postal Digital Token) and 216 (Vendor Digital Token) which authenticate the Postage Amount 202 and other encrypted information printed on the mail piece. Because of the relationship of the printed information and the encrypted digital tokens the Postage Amount 202 imprinted on the mail piece can be authenticated at a later date by a postal service and also by the manufacturer (vendor). The use of postal digital tokens 214 and vendor digital tokens 216 are described in the above identified U.S. patent application. The piece count which constitutes a digital token serial number, is shown at 219. The digital token serial number 219 is included in the data input to the digital token transformation used to generate the digital tokens 214 and 216. A check digit or other error control code is shown at 217.

Figure 3:
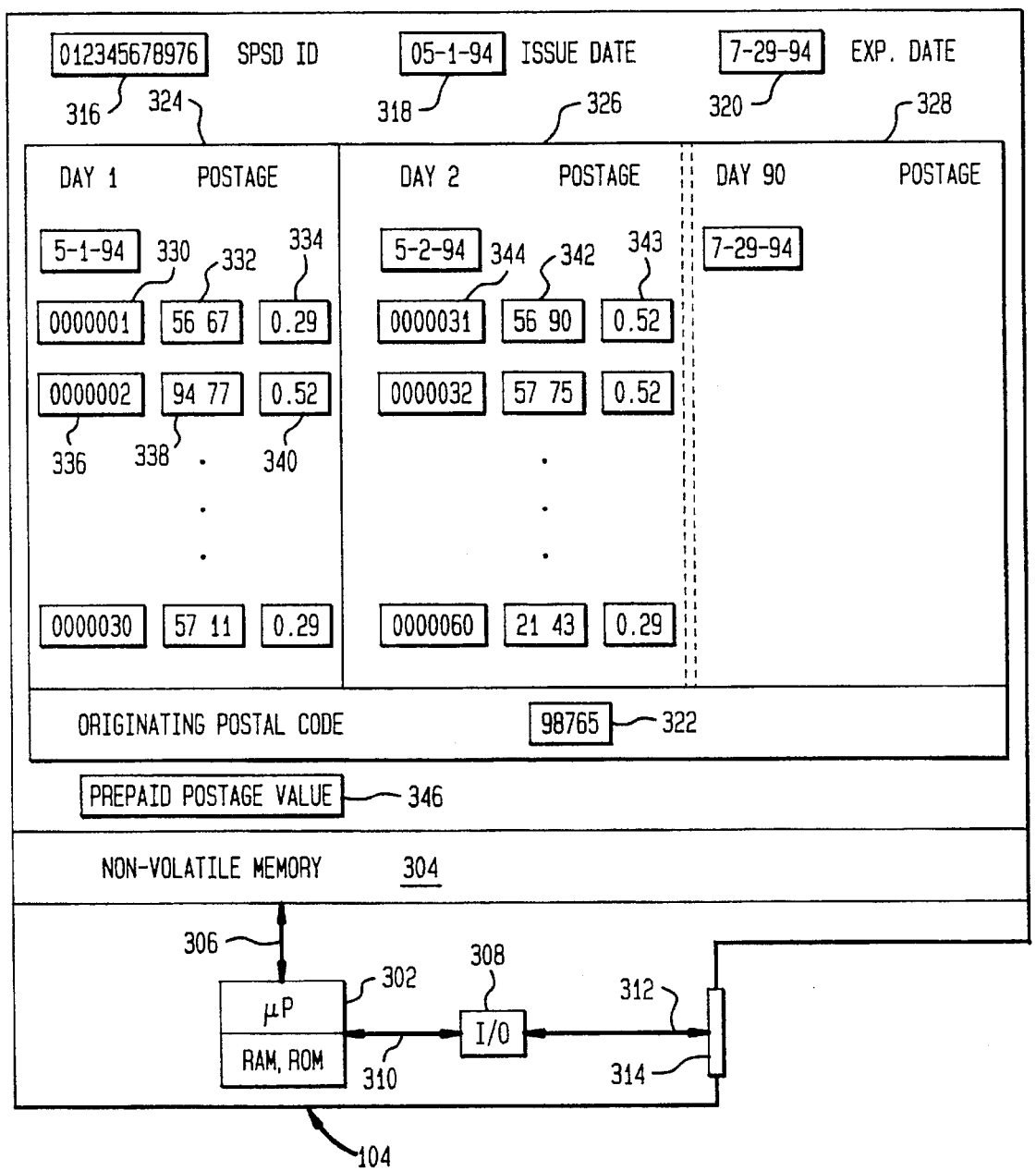
FIG. 3 is a diagrammatic representation of a secure portable storage device suitable for use with the advanced postage payment system shown in FIG. 1.

Reference is now made to FIG. 3. The secure portable storage device 104 includes a central processing unit 302 containing a microprocessor and all necessary peripheral devices such as random access memory (RAM) and read only memory (ROM). The device 104 is a secure portable storage device which precludes writing into the device after the device has been put in service. The secure portable storage device can be implemented via well known technologies such as smart cards, personal computer microcard industry association (PCMCIA) cards or other technology. The communication between the advanced postage payment system and the secure portable storage device 104 does not have to be secure. This provides additional cost savings. The number of possible digital tokens stored in the secure portable storage device 104 is limited only by the physical limitations of available storage technology.

The central processing unit 302 is connected to a non-volatile programmable memory shown generally at 304 via a bi-directional address and data bus 306. Additionally, the central processing unit 302 is connected to an input/output device (I/O) 308 through an additional bi-directional address and data bus 310. The I/O device 308 is coupled via another bi-directional address and data bus 312 to a secure portable storage device connector 314. The connector 314 is adapted to cooperate in operative relationship with the connectors, not shown, associated with the secure portable storage device reader 106.

The non-volatile memory 304 is capable of having data read from it and written into it by the central processing unit 302. The central processing unit 302, however, will not allow any data external from the card 104 to be transferred via the connector 314, the I/O device 308 and the central processing unit 302 to write into any secure postage storage areas of the non-volatile memory 304. In a preferred embodiment, the non-volatile memory 304 may not have any data whatsoever written into it from an external source since this is not necessary to operation of the present invention and enhances the security of the system.

The non-volatile memory includes a number of memory locations containing data necessary to account for and store pre-computed digital tokens to be printed by the advanced postage payment system 102. The secure portable storage device identification is stored in the non-volatile memory 304 at 316. In the particular configuration shown, the lead digit of this identification, "0", is the Vendor Identification 208 printed on the mail piece 112. The remaining digits of the secure portable storage device identification 316 are printed as on the mail piece 112 as the Secure Portable Storage Device identification 210. The date of the secure portable storage device 104 issue or activation, (as desired), is located at 318. A expiration date for the secure portable storage device 104 is stored at 320. This expiration date is the date beyond which the device 104 is no longer operable to issue digital tokens for printing by the system 102. The non-volatile memory 304 also contains the Originating Postal Office Code 322 which defines a predetermined geographical location in which a mail piece utilizing a pre-computed digital token stored on the secure portable storage device 104 may be deposited into the mail stream.

A plurality of digital tokens (both postal and vendor tokens) are stored for each of a series of days. From day 1 through 90 shown, respectively, as 324, 326 and 328. For each day, day 1 through day 90, (including those days, day 3 through day 89, not shown) a predetermined number of pre-computed digital tokens are stored. The digital tokens are stored and organized by a piece count number or digital token serial number 330 for each digital token. Since thirty digital tokens are stored for day 1, thirty piece counts are provided; however, it should be noted that these can be a single number which is incremented for each of the tokens. This is because from the data storage point of view, various standard techniques may be employed to considerably compress the data while not losing information. Associated with the piece count 330 is a pair of digital tokens 332 having a particular value here shown at 334 as $0.29. The next digital token pair is identified by an incremented piece count shown at 336. These digital tokens 338 have a value of $0.52 shown at 340. A continued series of digital tokens may be stored for the particular day of different values, as desired by the purchaser of the secure portable storage device 104. The number of digital tokens stored for any particular day limit both the number of tokens that may be issued by the device on that day and the total value of postage which may be issued on that day.

Reference is now made to day 2, shown at 326. The specific digital token series 342 has been shown as printed on the mail piece 112. This represents a postage value of $0.52 shown at 343 and a piece count of 0000031 shown at 344. Each time a digital token is retrieved from the non-volatile memory 304 by the central processing unit 302, the prepaid postage value register 346 is decremented to reflect the issuance of the digital token by the secure portable storage device 104. Each time a digital token is retrieved, that is, dispensed, from the nonvolatile memory 304 the memory location is disabled, for example, by erasing the data at the memory location from where the digital token was retrieved. This precludes dispensing a digital token more than once. The process continues until the prepaid postage value stored in register 346 reaches zero or below the value for the minimum postage digital token still available for retrieval. When this occurs, no further digital tokens are retrievable from the secure portable storage device 104, even though additional digital tokens, not used, may remain stored in the non-volatile memory 304. The printed postage value register 346 can, of course, be arranged in other ways such as incrementing each time a digital token is retrieved until the initially stored prepayment value is reached.

In the above manner, a plurality of digital tokens having a predetermined value, that is, the sum total value of all of the digital tokens stored in the non-volatile memory for each of the days for which the secure portable storage device 104 is usable. This predetermined value may be equal to or less than the prepaid value stored in the prepaid postage value register 346. For example, if the prepaid postage value stored (or remaining after use) in register 346 was $0.81, all or part of this value could be used on day 1 or day 2 to retrieve a digital token having a specific value of $0.29 and another digital token having a specific value of $0.52.

To provide a greater flexibility, the stored digital tokens will normally exceed the value of the prepaid postage value stored in register 346. This is to enable a user to issue digital tokens that correspond to the rate table and rate table breaks of the particular postal service. Thus, as is presently the case in the United States, the first ounce for a mail piece is $0.29 while the mail pieces over 1 ounce and under 2 ounces are $0.52. Therefore, these represent postage values for digital tokens that a user would find highly desirable. Fewer digital tokens may be stored for a given day for 3 ounce mail pieces, $0.75, since a mailer's usage pattern may involve more mail pieces under the 1 ounce or 2 ounce mail piece weight breaks. Thus, a given mailer taking into account the mailer's needs, both in terms of the daily postage usage and types of mail being posted, as well as the days in the mailing cycle for the mailer, can specify and tailor the digital tokens stored on the portable storage device 104 to meet the particular unique needs of the mailer. Thus, if the mailer has a particular high mail volume on day 4 of the month, the mailer may arrange for the digital tokens on May 4, 1994 for card 104 to have a high volume of postage of particular denominations. This ability to selectively store digital tokens of a different denomination usable on particular days in a manner which correlates to the mailer's past experience, helps the mailer to avoid misappropriation of postal funds for other than authorized applications, since the anticipated postage needed is available on specified days. If the available digital token postage does not correspond to the required usage, an investigation can be made by the mailer as to the reason for non correspondence.

Figure 4:
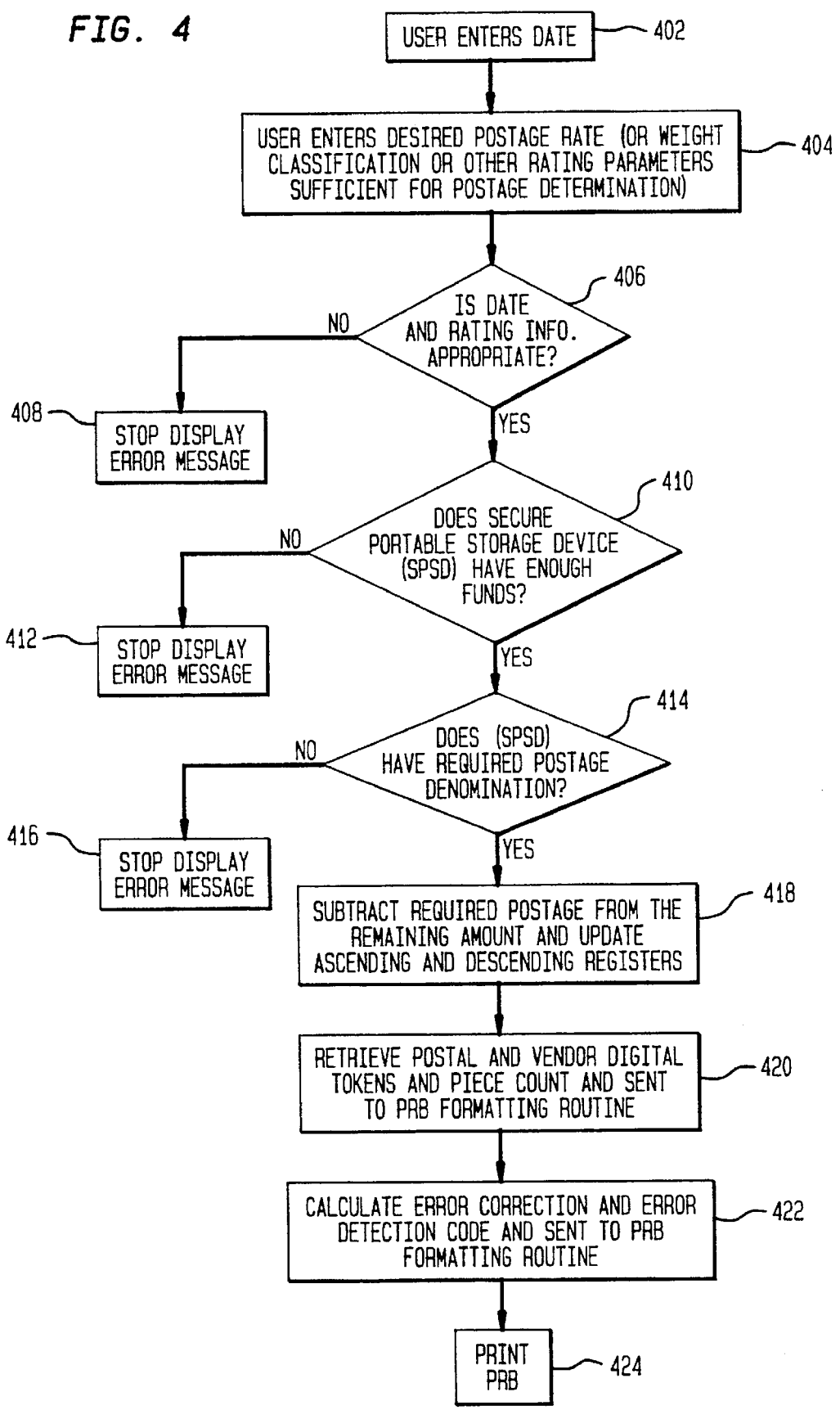
FIG. 4 is a flow chart of the operation of the advanced postage payment system shown in FIG. 1.

Reference is now made to FIG. 4. A user enters a current date at 402. The user then enters the desired postage rate denomination at 404. Alternatively, the user may enter the rate classification or other rating parameters sufficiently for appropriate postage determination. If the date and rating information is not appropriate at 406, the process is stopped and an error message is displayed at 408. On the other hand, if the date and rating information is appropriate, the process continues and a determination is made at 410 if the secure removable storage device has sufficient funds in the prepaid postage value register 346. If sufficient funds do not exist, the process is stopped and an error message is displayed at 412. If sufficient funds are available, the process continues and a determination is made at 414 if the secure portable storage device has the required postage denominations requested by the user or determined at 404. If the required denominations are not available, the process is stopped and an error message is displayed at 416. If the required denominations are available, the required postage is subtracted at 418 from the remaining amount in the prepaid postage value register 346. Depending upon the system design, updating of other registers that may be within the prepaid postage value register 346 can be implemented. These may include an ascending and a descending register. In such case the ascending and descending registers are used as a form of double balance lockout system and error checking system as is known in existing postage meter systems.

The process continues with the retrieval of the postal and vendor digital tokens and piece count data which is sent to a postal revenue block formatting routine at 420. The postal revenue block formatting routine is designed to format the data for appropriate printing on a mailpiece in the form shown in FIG. 2. Any suitable formatting routine may be used with the present invention. An error correction and error detection code is calculated and is sent to the postal revenue formatting routine at 422 to be formatted with other data to be printed. The postal revenue block (PRB) is then printed at 424. It should be noted that the postal revenue block formatting routine desirably resides outside the secure portable storage device 104. It may be part of the software associated with advanced postage payment system controller 108 or printer 110. The same applies to the calculation of the error correction and error detection code.

It should be recognized from the above description that the secure portable storage device includes a prepaid postage value register 346 which records the total available postage.

Before a pair of digital tokens corresponding to a postage request is retrieved two tests must be performed. First, the value of the postage request is compared to the value available in the prepaid postage value register. Second, the postage value and date of submission are compared to the value and date of the available tokens.

If sufficient funds are available, and if a pair of tokens for the requested value and date is available, then the piece count and digital tokens are retrieved by the microprocessor on the secure portable storage device.

The area of nonvolatile memory containing the retrieved data is disabled, for example by erasing the data. The prepaid value register is decreased by the value of the denomination of postage requested. After these operations are complete the data is provided to the communication port of the secure portable storage device.

Figure 5:
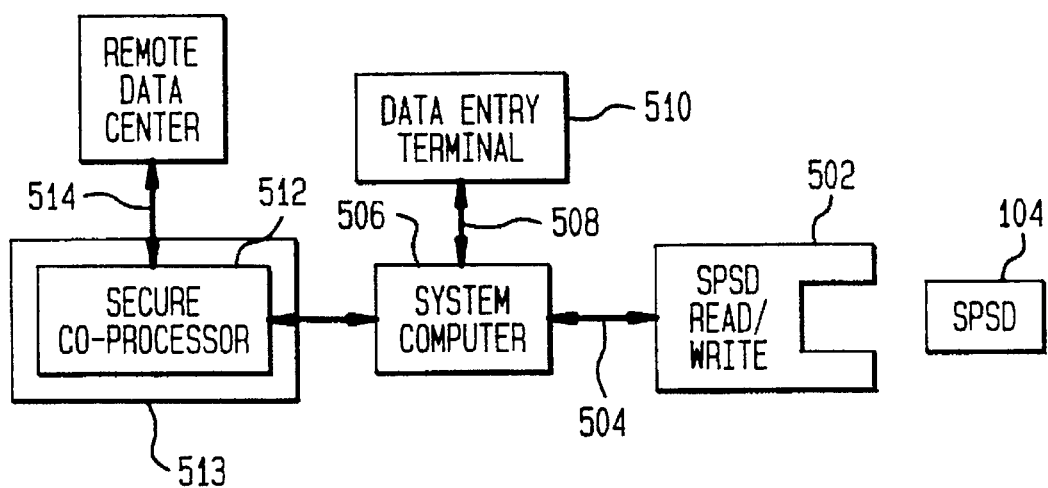
FIG. 5 is a block diagram of a system for generating and loading pre-computed digital tokens into the secure portable storage device shown in FIG. 3.

Reference is now made to FIG. 5. The secure portable storage device 104 is adapted to be connected to a secure portable storage device read/write unit 502. The device 104 prior to being processed by unit 502, except as explained below, has no data relating to the digital tokens stored in the non-volatile memory 304 and the memory is clear in the locations where the tokens are to be stored. The unit 502 is connected by a bi-directional communications bus 504 to a System Computer 506, which in turn is connected by a bi-directional communications bus 508 to a data entry terminal 510. The system computer 506 is connected to a secure co-processor 512 which generates in the present embodiment, both the vendor tokens and the postal tokens for storage via the computer system 506 and the read/write unit 502 in the secure portable storage device 104. A secure communications link 514 is provided to a remote data center which may include both the postal data center and the vendor data center for key management purposes to periodically update the encryption key used to generate the postal digital tokens and the vendor encryption key used to generate the vendor digital tokens. Other key management arrangements of these secure co-processor key generations are possible. Various arrangements are disclosed in the above identified co-pending patent application as well as in U.S. patent application of Hyung-Kun Kim, Robert A. Cordery and Leon A. Pintsov, Ser. No. 08/133,416, filed Oct. 8, 1993 entitled ENCRYPTION KEY CONTROL SYSTEM FOR MAIL PROCESSING SYSTEM HAVING DATA CENTER VERIFICATION and assigned to Pitney Bowes Inc., the entire disclosure of which is hereby incorporated by reference; and, U.S. patent application of Leon A. Pintsov, Richard A. Connell, Ronald P. Sansone and Alfred C. Schmidt, Ser. No. 08/133,398, filed Oct. 8, 1993 for POSTAL RATING SYSTEM WITH VERIFIABLE INTEGRITY, and assigned to Pitney Bowes Inc., the entire disclosure of which is hereby incorporated by reference, now U.S. Pat. No. 5,448,641.

As it can be seen from the above, the secure co-processor 512 computes postal and vendor digital tokens based on a secret key stored therein. The secure co-processor communicates tokens to a system computer 506 which, in turn, passes them for storage in the secure portable storage device 104. The secure co-processor 512 is housed in tamper resistant protected housing 513. Key updates can be organized via a secure channel to a Data Center. The Data Center generates and updates keys for all secure portable storage device generation systems and all verification devices.

It should be expressly noted that the described system can generate both standard and custom made secure portable storage devices with ease. For example, the standard selection can be $50.00 worth of postage which can be spent in a single denomination ($0.32) for three months up to 20 letters a day, or $60.00 worth of postage which can be spent in two denominations ($0.32 and $0.57) for two months up to 10 letters a day, etc. A custom selection can be $96.00 worth of postage which can be spent in a single denomination ($0.32) for three days up to 100 letters a day. In case of secure portable storage device malfunction, any postage left in the secure portable storage device can be credited to the customer and loaded into a new secure portable storage device. The process of doing so can be implemented by using smart cards of the type described in the text Contemporary Cryptology, noted below.

Figure 6:
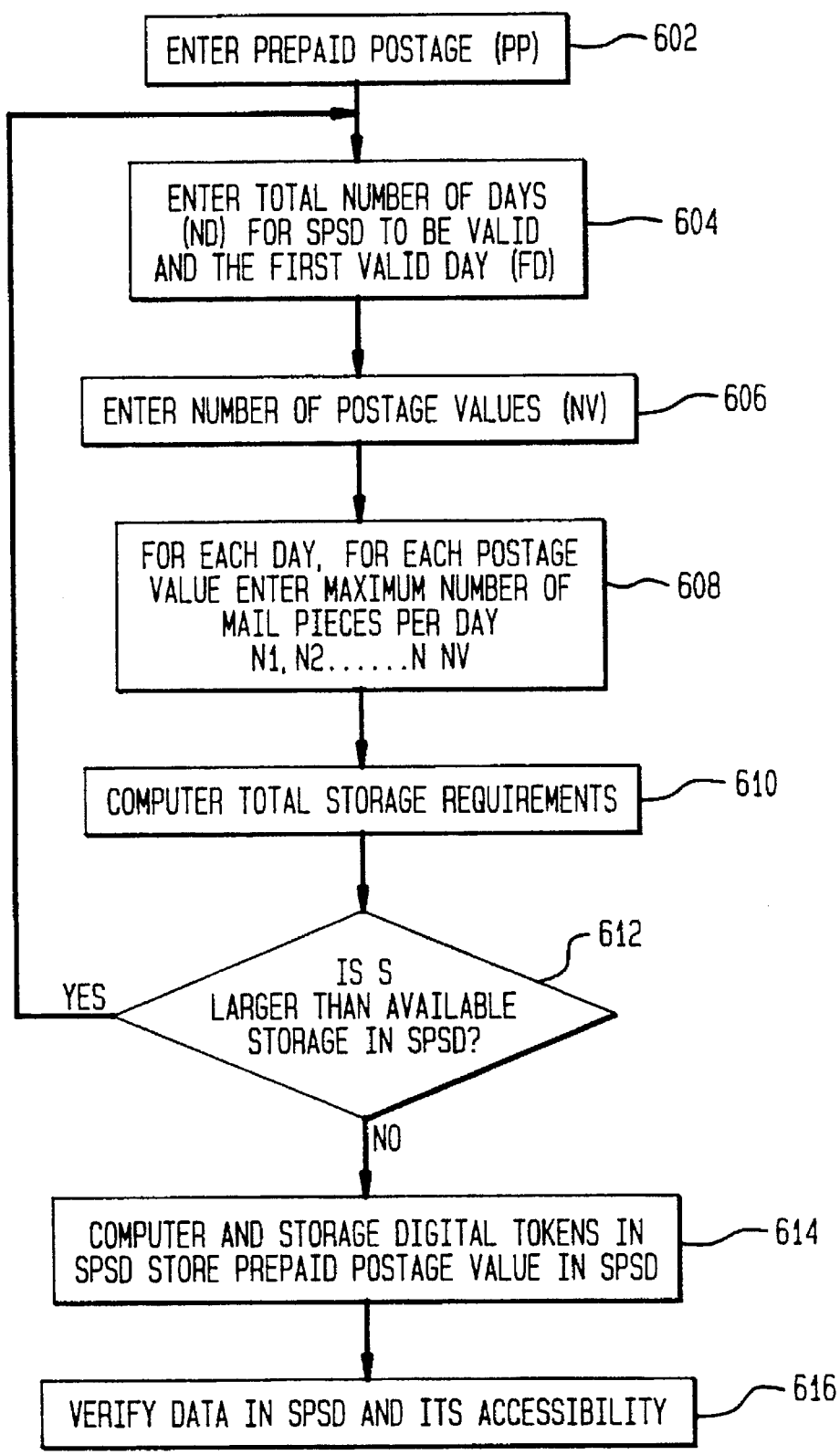
FIG. 6 is a flow chart of the operation of the system for generating end loading pre-computed digital tokens shown in FIG. 5; and, FIGS. 7, 8 and 9 are memory requirement tables for various digital token data arrangements suitable for use in the secure portable storage device shown in FIG. 3.

Reference is now made to FIG. 6. The prepaid postal value, the value stored in register 346 on secure portable storage device 104, is entered at 602. The total number of days for which the secure portable storage device is valid and the first valid day for the device is then entered at 604. Thereafter, the number of postage values, that is, the various postage denominations, is entered at 606. For each day, each postal value of denomination is specified as well as the number of denominations and total number of mail pieces for that day at 608. The number of mail pieces corresponds to the secure portable storage device piece count arranged for the particular day. Thus, for example, for day 2 on device 104, the number of mail pieces is thirty with the piece count ranging from a first piece count of 31 and a final piece count of 60.

The total storage requirement is then computed at 610. If the computed total storage requirements is larger than the storage available in the secure portable storage device non-volatile memory 304, the system loops back and requires a new configuration to be entered. If the storage requirements for the specified configuration is not larger than the secure portable storage device non-volatile memory 304, then at 614 the digital tokens are computed and stored in the secure portable storage device non-volatile memory and the prepaid postage value is stored in register 346. Finally, the data stored in the secure portable storage device with pre-computed digital tokens and its accessibility is verified at 616 to insure an operable device has been created.

As an exception to precluding writing to nonvolatile memory 304 after the secured portable storage device has been put in service, it should be expressly noted that the secure portable storage device 104 may be of that group of devices that is capable of having areas of the non-volatile memory securely protected from having data written therein which secure protection can be selectively enabled and disabled. Examples of such devices are described in Chapter 12, entitled "The Smart card, Standardized Security Device Dedicated To Public Cryptology" of the text Contemporary Cryptology, The Science of Information Integrity, published IEEE Press and edited by Gustavus J. Simmons, Sandia National Laboratories, copyright 1992 by the Institute of Electrical and Electronic Engineer Inc. With devices of this type, the secure portable storage device 104 may be reused to store additional digital tokens on the device. This reduces the card cost by allowing the secure portable storage device to be reused. If desired, the number of write cycles to the non-volatile memory 304 can be limited by hardware incorporated on the device so that the card may be reusable, for example, 2, 3, 4 or any other selected number of times.

Reference is now made to FIGS. 7–9. The amount of memory required for the secure portable storage devices for various digital token configurations is shown in table form. The table shows the memory requirements for periodically loading a secure portable storage device with pre-computed token values to thereafter be selectively retrieved for use with an advanced postage payments system. For a given advanced postage payment system, the variable information may be the postage value amount, the piece count, and the date. To assure that the memory space required is limited to the amount allowed by current "smart card" capabilities, certain restrictions are placed on the variable information. Thus, the postage value amounts will only be available in a limited number of denominations such as one, two, or three denomination, for example, $0.19, $0.29, and $0.52. Also, the digital tokens will be valid for a limited period of time and limitations will be placed on how many indicias may be printed each day (or group of days).

The postage evidencing device identification in the present described system is replaced by the secure portable storage device serial number and each serial number will be used for one card purchase only. This will necessitate using a wider range of serial numbers because of the larger number of secure portable storage devices. Additionally, using a non-consecutive piece count could cause the piece count to run up very quickly. Since each card identification is used only once, this problem is resolved by initializing the piece count to 1 for every card. Alternatively, upon surrendering a card with a given identification, a new card may be issued with the same identification and higher piece counts. Various arrangements are possible and are within the scope of the present invention.

With regard to the amount of memory required by the pre-computed tokens, first suppose that there are B denominations available, the piece count ranges from 1 to C, and the postage can be used over a period of D days. In this case, at initialization of the secure portable storage device memory it would not be known which combination of inputs will be used and all are possible so the look-up table would have to cover all (B)(C)(D) combinations. For example, if B=2, C=100, and D=30, then the number of possible inputs to the digital token transformation is 6000. A digital token system as shown in connection with FIGS. 1–6 requires 16 bits for each pair of tokens because the present system employs two digital tokens each having two decimal digits, requiring four bits per digit when binary coded.

Since each pair of tokens can be represented by 16 bits, a look-up table, the above example, requires about 12K of memory. This is because the secure portable storage device memory can be organized so that very little additional storage is required for indexing the denominations, piece counts, and dates associated with the token information. This size of storage may exceed current standard mass produced smart card memory capabilities, but can, of course, be implemented in a secure vault or cartridge type of arrangement where the memory may be of a much larger size.

To reduce the number of combinations, so that the storage size does not exceed current standard mass produced smart card memory capabilities, such as 2 to 3 kilobyte memory storage smart cards, the daily postage use may be limited to N pieces per day and the piece counts to 1 to N on day 1, N+1 to 2N on day 2, etc. In the following, a unique denomination is assigned to each piece count. In this arrangement, piece counts are skipped if all N pieces are not used. Then if D=30, and N=10, the number of combinations is (D)(N)=300 and the look-up table requires 0.6K of memory. This is clearly attainable with current smart cards. Here the total number of pieces C is only used to regulate the total number of mail pieces generated and can be eliminated because a prepaid postage value register, which was previously noted and may be a descending funds or other type of register, is maintained. If N=C, that is, there are no restrictions on daily postage use, then the memory requirements may again exceed that of current mass produced smart cards. The memory requirements (in kilobytes) for the number of different denominations ranging from 1 to 3, a number of days ranging from 10 to 90 (in increments of 2), and the maximum number of mail pieces per day ranging from 5 to 100 (in increments of 5) are shown in FIGS. 7–9.

The memory requirement above can be generalized as follows. A user will be allowed to purchase a secure portable storage device containing pre-computed tokens that have been tailored to suited needs. The tokens will be valid over a period of D days, and on the $i^{th}$ day, the postage use will be restricted to $N_i$ pieces (on day i, the available piece counts will range from $N_1+N_2+N_3+\ldots+N_{i-1}+1$ to $N_1+N_2+N_3+\ldots+N_{i-1}+N_i$). The mailer may also elect for different postage denominations (as many as B) but a unique denomination is assigned to each distinct piece count. The total number of tokens that must be pre-computed to account for all possibilities is:

$$\sum_{i=1}^{D} N_i$$

Additionally, the mailer will purchase an amount of postage value to cover the mailer's anticipated usage. This will be stored in the prepaid postage value registers. At the end of D days, the remaining postage, if any, will either be refunded or transferred to the next secure portable storage device.

Typically, D will range from 30 to 60 days. Then, if there are about 2K of memory available for the look-up table to store digital tokens, the daily use profiles, $(N_1, N_2, N_3, \ldots, N_D)$ that can be accommodated are those for which $$\sum_{i=1}^{D} N_i \leq 1000.$$

For example, if D=30, then a mailer can set up his card to allow as many as 33 tokens each day on if the mailer anticipates a high use during a two day period, the mailer can set up the secure portable storage device to allow 100 pieces on each of those two days and as many as 30 pieces on the other 28 days. In the latter case, it is important that the mailer be able to accurately predict the mailer's bulk needs on each of the two high usage days. Even if D is as high as 100, however, a secure portable storage device in a smart card form can still be set up to allow as many as 10 pieces each day. This is not very restrictive, particularly for home or for small business use.

FIG. 7 displays the memory requirements in kilobytes for a single denomination card, that is, a card containing a single postage value providing the maximum number of mail pieces per day in the top row and the number of days for which the card is valid in the left most column. Thus, for example, a card which will have a maximum number of 35 mail pieces per day for a period of 40 days will require 2.8 kilobytes of non-volatile storage memory. In FIG. 8, two different denominations of postage value are allowed for each piece count. The number of storage requirements in kilobytes is again shown for various maximum number of mail pieces per day for specified number of day. In this case, as an example, for a maximum 50 mail pieces per day for a period of 90 days the card will require 18 kilobytes of non-volatile memory. Finally, in FIG. 9, a memory requirements table is shown for three different denominations of postage values for various maximum number of mail pieces per day for a specified number of days. Here, for example, for a maximum number of 80 mail pieces per day for a period of 48 days the card would require 23.04 kilobytes of non-volatile memory.

While the present invention has been disclosed and described with reference to the disclosed embodiments thereof, it will be apparent, as noted above, that variations and modifications may be made therein. It is, thus, intended in the following claims to cover each variation and modification that falls within the true spirit and scope of the present invention.

What is claimed is:

1. A method for postage payment comprising:
   generating a plurality of dispensable discrete items of encrypted data, each of said items of encrypted data having a specific value;
   storing said plurality of dispensable discrete items of encrypted data on a portable medium;
   storing a prepayment value on said portable medium;
   limiting said stored plurality of discrete items of encrypted data which are dispensable based on the prepayment value stored on said portable medium; and
   dispensing at least a selected one of said plurality of dispensable discrete items of encrypted data from said portable medium as part of a postage indicium to be printed on a mailpiece.

2. A method as defined in claim 1 further comprising:
   limiting the dispensing of of said plurality of dispensable discrete items of encrypted data to a total value that does not exceed said prepayment value.

3. A method as defined in claim 1 further comprising:
   limiting the dispensing of said plurality of dispensable discrete items of encrypted data to a predetermined number of discrete items of encrypted data which can be dispensed during a predetermined time period.

4. A method as defined in claim 1 further comprising:
   limiting the dispensing of said of plurality of dispensable discrete items of encrypted data to a predetermined value of discrete items of encrypted data which can be dispensed during a predetermined time period.

5. A method as defined in claim 1 further comprising:
   limiting the dispensing of said plurality of dispensable discrete items of encrypted data (a) to a predetermined number of discrete items of encrypted data which can be dispensed during a predetermined time period and (b) to a predetermined total value number of discrete items of encrypted data dispensed during a predetermined time period.

6. A method as defined in claim 1 further comprising:
   limiting the dispensing of said generated plurality of dispensable discrete items of encrypted data to a predetermined dispensing cut off time period.

7. A method as defined in claim 1 wherein each of said plurality of dispensable discrete encrypted data contain encrypted information of (a) the specific value and (b) a locality from which a mail piece is to enter a mail carrier delivery process.

8. A method as defined in claim 1 wherein said plurality of dispensable discrete items of encrypted data comprises a plurality of groups of dispensable discrete items of encrypted data, each of said groups having the same specific value representing a payment amount which corresponds to a postage payment rate for a mail piece.

9. A method as defined in claim 1 wherein each of said plurality of dispensable discrete items of encrypted data contains encrypted information of the date on which said discrete items of is to be entered into a mail carrier delivery process.

10. A method as defined in claim 1 wherein said portable medium contains a processing means and a nonvolatile memory means connected thereto, said plurality of dispensable discrete items of encrypted data and said prepayment value being stored in said non-volatile memory means.

11. A method as defined in claim 10 wherein access to said nonvolatile memory means is controlled to allow dispensing of a selected one of said plurality of dispensable discrete items of encrypted data stored therein only after the specific value of said selected one of said plurality of dispensable discrete items of encrypted data to be dispensed has been accounted for with respect to said stored prepayment value.

12. A postage payment system, comprising:
    means for generating a plurality of dispensable discrete items of encrypted data, each of said items of encrypted data having a specific value;
    means for storing said generated plurality of dispensable discrete items of encrypted data on a portable medium;
    means for storing a prepayment value on said portable medium;

means for limiting said stored plurality of discrete items of encrypted data which are dispensable based on the prepayment value stored on said portable medium; and means for dispensing at least one of said plurality of dispensable discrete items of encrypted data from said portable medium as part of a postage indicium to be printed on a mailpiece.

13. A system as defined in 12 wherein said dispensing means limits the dispensing of said plurality of discrete items of encrypted data to a total value that does not exceed said stored prepayment value said total value being a sum of the specific value of each of said plurality of dispensable discrete items of encrypted data dispensed.

14. A system as defined in claim 12 wherein said dispensing means limits the dispensing of said plurality of discrete items of encrypted data to a predetermined number of discrete items of encrypted data which can be dispensed during a predetermine time period.

15. A system as defined in claim 12 wherein said dispensing means limits the dispensing of said plurality of discrete items of encrypted data to a predetermined value of discrete items of encrypted data which can be dispensed during a predetermined time period.

16. A system as defined in claim 12 wherein said means for dispensing limits the dispensing of said plurality of discrete items of encrypted data (a) to a predetermined number of discrete items of encrypted data which can be dispensed during a predetermined time period and (b) to a predetermined total value number of discrete items of encrypted data dispensed during a predetermined time period.

17. A system as defined in claim 12 wherein said plurality of dispensable discrete items of encrypted data are a plurality of dispensable digital tokens, said portable medium means for limiting includes a processing means, said means for storing prepayment value includes a nonvolatile memory means connected to said processing means, and said means for storing discrete items of encrypted data includes nonvolatile memory means connected to said processing means.

18. A system as defined in claim 17 wherein said processing means controls access to said digital token nonvolatile memory means to allow dispensing of selected ones of said plurality of digital tokens stored therein only after the specific value of each selected digital to be dispensed has been accounted for with respect to prepayment value.

19. A system as defined in claim 17 wherein access to said digital token nonvolatile memory means is controlled to allow access of said digital tokens stored therein only after the value of each selected digital token to be dispensed has been accounted for with respect to said stored prepayment value.

20. A portable storage device, comprising:

memory means for storing a plurality of dispensable digital tokens, each of said plurality of digital tokens having a specific value; and, means for accounting for digital tokens dispensed from said memory means.

21. A portable device as defined in claim 20 wherein each of said digital tokens is dispensable on a predetermined day.

22. A portable device as in claim 20 wherein each digital token has a specific value which represents a postage payment amount corresponding to a postage payment rate for a mail piece.

23. A portable device as defined in claim 22 wherein each of said plurality of digital tokens contain (a) identifying data for said portable device and (b) a geographic locality code from which a mail piece imprinted with dispensed digital token is to enter a mail carrier delivery process.

24. A portable member for an advanced postage payment system, comprising:

housing means;

a register means within said housing for storing a postage prepayment value;

means for storing a plurality of discrete items of encrypted data in said housing, each of said items of encrypted data adapted to be formatted for printing and each of said encrypted items of data having a specific value; and, means within said housing coupled to said means for storing and to said prepayment register for enabling at least one selected item of encrypted data to be communicated outside of said housing if the value stored in said register means is at least equal to the specific value of said selected item of encrypted data.

25. A portable medium as defined in claim 24 wherein each of said items of encrypted data is dispensable on a predetermined day.

26. A portable medium as in claim 24 wherein said specific value of each of said plurality of discrete items of encrypted data represents a postage payment amount corresponding to a postage payment rate for a mail piece.

27. A portable medium as defined in claim 24 wherein each of said plurality of discrete items of encrypted data contain (a) identifying data for said portable medium and (b) a geographic locality code from which a mail piece imprinted with said discrete item of encrypted data is to enter a mail carrier delivery process.

* * * * *